(12) United States Patent
Chen et al.

(10) Patent No.: US 9,967,179 B2
(45) Date of Patent: May 8, 2018

(54) CONSTRAINED SHORTEST PATH FIRST FOR TEMPORAL TUNNEL SERVICES

(71) Applicant: Futurewei Technologies, Inc., Plano, TX (US)

(72) Inventors: Huaimo Chen, Bolton, MA (US); Renwei Li, Sunnyvale, CA (US)

(73) Assignee: Futurewei Technologies, Inc., Plano, TX (US)

( * ) Notice: Subject to any disclaimer, the term of this patent is extended or adjusted under 35 U.S.C. 154(b) by 74 days.

(21) Appl. No.: 15/157,944

(22) Filed: May 18, 2016

(65) Prior Publication Data

US 2016/0344626 A1 Nov. 24, 2016

Related U.S. Application Data

(60) Provisional application No. 62/163,899, filed on May 19, 2015.

(51) Int. Cl.
| | |
|---|---|
| *H04L 12/723* | (2013.01) |
| *H04L 12/721* | (2013.01) |
| *H04L 12/913* | (2013.01) |
| *H04L 29/06* | (2006.01) |
| *H04L 12/70* | (2013.01) |

(52) U.S. Cl.
CPC ............. *H04L 45/50* (2013.01); *H04L 45/12* (2013.01); *H04L 2012/5668* (2013.01)

(58) Field of Classification Search
CPC .. H04L 45/50; H04L 45/12; H04L 2012/5668
See application file for complete search history.

(56) References Cited

U.S. PATENT DOCUMENTS

| | | | |
|---|---|---|---|
| 7,319,700 B1* | 1/2008 | Kompella | H04L 45/02 370/227 |
| 2004/0042406 A1* | 3/2004 | Wu | H04L 45/02 370/238 |

OTHER PUBLICATIONS

Chen, H., et al., "Extensions to OSPF for Temporal LSP draft-chen-ospf-tts-00.txt" Internet Engineering Task Force, Standards Track, Jul. 3, 2015, 12 pages.*

* cited by examiner

*Primary Examiner* — Gbemileke J Onamuti
(74) *Attorney, Agent, or Firm* — Conley Rose, P.C.

(57) ABSTRACT

An ingress node configured to receive a first request for a temporal label switched path (LSP) in the network. The first request indicates the ingress node, egress node, network constraint, and scheduled time interval having a predetermined start time and a predetermined end time for the temporal LSP to carry traffic. The ingress node computes a shortest path in the network for the temporal LSP that satisfies the network constraint in a shifted time interval when the request indicates that the time interval is elastic, and reserves a network resource for use during the shifted time interval for the temporal LSP in advance of the predetermined start time on a link extending from the ingress node to a next hop node on the path. The ingress node sends a path message to the next hop node to set up the temporal LSP in the shifted time interval.

20 Claims, 13 Drawing Sheets

CONSTRAINED SHORTEST PATH FIRST FOR TEMPORAL TUNNEL SERVICES

CROSS-REFERENCE TO RELATED APPLICATIONS

This application claims priority to U.S. provisional patent application No. 62/163,899, filed May 19, 2015 by Huaimo Chen et al., and titled "CSPF for Temporal Tunnel Services," which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Multiprotocol label switching (MPLS) is a data-carrying mechanism that directs data from one network node to a next network node based on path labels instead of network addresses, avoiding complex lookups in a routing table. The path labels identify virtual links or paths between distant nodes, rather than endpoints. MPLS may be used to carry different kinds of traffic, including Internet protocol (IP) packets, asynchronous transfer mode (ATM) frames, synchronous optical networking (SONET) frames, and Ethernet frames. A constrained shortest path first (CSPF) algorithm is an advanced version of a shortest path algorithm used in open shortest path first (OSPF) and intermediate system to intermediate system (ISIS) route computations. CSPF is used in computing a shortest path for a label-switched path (LSP) based upon multiple constraints. The CSPF algorithm considers a topology of a network, attributes of the LSP, and links in computing a path for the LSP.

SUMMARY

The problem in the prior art is that a network element computes a shortest path from a source to an egress that satisfies a given set of constraints without considering a time for which to reserve a network resource for the path. The concepts disclosed herein solve this problem by configuring a network element to determine a shortest path from a source to the egress that satisfies the set of constraints for an elastic time interval.

In one embodiment, the disclosure includes ingress node in a network, comprising a receiver configured to receive a request for a temporal label switched path (LSP) in the network, wherein the request indicates the ingress node, an egress node, a network constraint, and a scheduled time interval having a predetermined start time and a predetermined end time for the temporal LSP to carry traffic, a processor coupled to the receiver and configured to compute a shortest path in the network for the temporal LSP, wherein the path satisfies the network constraint in a shifted time interval when the request indicates that the time interval is elastic, and reserve a network resource for use during the shifted time interval for the temporal LSP in advance of the predetermined start time, wherein the network resource is reserved on a link extending from the ingress node to a next hop node on the path, and a transmitter coupled to the processor and configured to send a path message to the next hop node to set up the temporal LSP in the network in the shifted time interval. In some embodiments, the disclosure also includes wherein reserving the network resource includes a future reservation, and wherein the network resource is reserved from a time-based traffic engineering link state database (TEDB), and/or wherein the request comprises a start time of the scheduled time interval, an end time of the scheduled time interval, and an elastic range upper bound, wherein the elastic range upper bound is a pre-defined amount of time by which the elastic time interval is permitted to shift positively to a later time than the start time, wherein the processor is further configured to determine a first time that is between a first shift start time and the elastic range upper bound, and wherein the first shift start time is the start time, wherein the first time is the only time between the first shift start time and the first time that has a link in a TEDB that satisfies the network constraint in a first time interval from the first time for a duration from the start time to the end time, wherein for times between the first shift start time and the first time the link does not satisfy the network constraint from each of the times for the duration, and/or wherein the processor is further configured to determine the shortest path from the ingress node to the egress node in the TEDB satisfying the network constraint in the first time interval when the first time is found, and/or wherein when no path is found from the ingress node to the egress node in the TEDB satisfying the network constraint in the first time interval, the processor is further configured to determine a second time that is between a second shift start time and the elastic range upper bound, and wherein the second shift start time is the first time, wherein the second time is the only time between the second shift start time and the second time that has a link in the TEDB that satisfies the network constraint in a second time interval from the second time for the duration from the start time to the end time, and wherein for times between the second shift start time and the second time the link does not satisfy the network constraint from each of the times for the duration, and determine the shortest path from the ingress node to the egress node in the TEDB satisfying the network constraint in the second time interval when the second time is found, and/or wherein the request comprises a start time of the scheduled time interval, an end time of the scheduled time interval, and an elastic range lower bound, wherein the elastic range lower bound is a pre-defined amount of time by which the elastic time interval is permitted to shift negatively to an earlier time than the start time, wherein the processor is further configured to determine a third time that is between the start time and the elastic range lower bound, wherein the third time is the only time between the start time and the third time that has a link in a TEDB that satisfies the network constraint in a third time interval from the third time for a duration from the start time to the end time, and wherein for times between the third time and the start time the link does not satisfy the network constraint from each of the times for the duration, and/or wherein the request comprises a start time of the scheduled time interval, an end time of the scheduled time interval, and an elastic range lower bound, and an elastic range upper bound, wherein the elastic range lower bound is a pre-defined amount of time by which the elastic time interval is permitted to shift negatively to an earlier time than the start time, wherein the elastic range upper bound is a pre-defined amount of time by which the elastic time interval is permitted to shift positively to a later time than the start time, wherein the processor is further configured to compute a first time that is between the start time and the elastic range upper bound, compute a second time that is between the elastic range lower bound and the start time, and determine a closer time of the first time and the second time, wherein the closer time is a time that is closer to the start time and has a link in a TEDB that satisfies the network constraint in a first time interval from the closer time for a duration from the start time to the end time, and wherein for times between the start time and the closer time the link does not satisfy the network constraint from each of the times for the duration, and/or wherein the request comprises a start time for the time interval and an elastic time range for the time interval, and wherein the processor is further configured to compute the path for the LSP by determining a minimum amount of time to shift the time interval from the start time such that the path satisfies the network constraint in the shifted time interval and the shifted time interval is positioned within the elastic time range, and initiate setup of the LSP in the shifted time interval to enable the LSP to carry traffic in the shifted time interval, and/or wherein the processor is further configured to initiate setup of the LSP in the elastic time interval by sending, via the transmitter, a Path message to a node along the path to initiate the creation of the LSP at a beginning of the shifted time interval, and sending, via the transmitter, a path teardown (PathTear) message to a node along the path to initiate the deletion of the LSP at an end of the shifted time interval.

In another embodiment, the disclosure includes a method implemented in a network element (NE), comprising receiving, via a receiver, a request requesting creation of a temporal label switched path (LSP) in a network, wherein the request indicates an ingress, an egress, a network constraint, a scheduled time interval having an elastic range, a predetermined start time and a predetermined end time for the temporal LSP to carry first traffic in a shifted time interval within the elastic range of the scheduled time interval, computing, via a processor, a shortest path for the temporal LSP by determining a minimum amount of time to shift the scheduled time interval from the start time such that the path satisfies the network constraint in a shifted time interval and the shifted time interval is positioned within the elastic time range and with the minimum time shift, determining, via the processor, whether a next hop link from the NE to a next downstream node on the shortest path comprises a sufficient amount of network resources in the shifted time interval to satisfy the network constraint, and reserving, via the processor, the network resource on the next hop link for use during the shifted time interval for the temporal LSP in advance of the predetermined start time according to the network constraint to facilitate data forwarding for the temporal LSP in the shifted time interval when the next hop link from the NE to the next downstream node on the shortest path comprises the sufficient amount of network resources in the shifted time interval to satisfy the network constraint. In some embodiments, the disclosure also includes sending, via the processor, a first Path message to itself, wherein the Path message comprises the path, the network constraint, and the shifted time interval, receiving, via the processor, the first Path message, generating, via the processor, a second Path message according to the first Path message to indicate the shifted time interval, and sending, via a transmitter of the NE, the second Path message to the next downstream node to request the creation of the temporal LSP in the network in the shifted time interval, and/or wherein the request comprises a start time of the scheduled time interval, an end time of the scheduled time interval, and an elastic range upper bound, wherein the elastic range upper bound is a pre-defined amount of time by which the elastic time interval is permitted to shift positively to a later time than the start time, wherein the method further comprises determining a first time that is between a first shift start time and the elastic upper bound, and wherein the first shift start time is the start time, wherein the first time is the only time between the first shift start time and the first time that has a link in a TEDB that satisfies the network constraint in a first time interval from the first time for a duration from the start time to the end time, and wherein for times between the first shift start time and the first time the link does not satisfy the network constraint from each of the times for the duration, and/or wherein when no path is found from the ingress to the egress in the TEDB satisfying the network constraint in the first time interval, the method further comprises determining a second time that is between a second shift start time and the elastic range upper bound, wherein the second shift start time is the first time, wherein the second time is the only time between the second shift start time and the second time that has a link in the TEDB that satisfies the network constraint in a second time interval from the second time for the duration from the start time to the end time, and wherein for times between the second shift start time and the second time the link does not satisfy the network constraint from each of the times for the duration, and determining the shortest path from the ingress to the egress in the TEDB satisfying the network constraint in the second time interval when the second time is found, and/or wherein the request comprises a start time of the scheduled time interval, an end time of the scheduled time interval, and an elastic range lower bound, wherein the elastic range lower bound is a pre-defined amount of time by which the elastic time interval is permitted to shift negatively to an earlier time than the start time, wherein the method further comprises determining a third time that is between the elastic range lower bound and the start time, wherein the third time is the only time between the third time and the start time that has a link in TEDB that satisfies the network constraint in a third time interval from the third time for a third duration from the start time to the end time, and wherein for times between the third time and the start time the link does not satisfy the network constraint from each of the times for the duration, and determining the shortest path from the ingress to the egress in the TEDB satisfying the network constraint in the third time interval when the third time is found, and/or wherein the request comprises a start time of the scheduled time interval, an end time of the scheduled time interval, and an elastic range lower bound, and an elastic range upper bound, wherein the elastic range lower bound is a pre-defined amount of time by which the elastic time interval is permitted to shift negatively to an earlier time than the start time, wherein the elastic range upper bound is a pre-defined amount of time by which the elastic time interval is permitted to shift positively to a later time than the start time, wherein the method further comprises determining a first time that is between the start time and the elastic range upper bound, determining a second time that is between the start time and the elastic range lower bound, determining a closer time of the first time and the second time, wherein the closer time is a time that is closer to the start time and has a link in a TEDB that satisfies the network constraint in a first time interval from the closer time for a duration from the start time to the end time, and wherein for times between the start time and the closer time the link does not satisfy the network constraint from each of the times for the duration, and determining the shortest path from the ingress to the egress in the TEDB satisfying the network constraint in the first time interval when the first time is found.

In yet another embodiment, the disclosure includes an apparatus, comprising a receiver configured to receive a request requesting creation of a temporal label switched path (LSP) in a network, wherein the request indicates an ingress, an egress, a network constraint and a scheduled time interval having an elastic range, a predetermined start time and a predetermined end time for the temporal LSP to carry traffic in a shifted time interval within the elastic range of the scheduled time interval, a processor coupled to the receiver and configured to compute a shortest path for the temporal LSP by determining a minimum amount of time to shift the scheduled time interval from the start time such that the path satisfies the network constraint in a shifted time interval and the shifted time interval is positioned within the elastic time range and with the minimum time shift, determine whether a next hop link from the apparatus to a next downstream node on the shortest path comprises a sufficient amount of network resources in the shifted time interval to satisfy the network constraint, and reserve the network resource on the next hop link for use during the shifted time interval for the temporal LSP in advance of a predetermined start time according to the network constraint to facilitate data forwarding for the temporal LSP in the shifted time interval. In some embodiments, the disclosure also includes wherein the request further comprises a start time of the scheduled time interval, a stop time of the scheduled time interval, and an elastic upper range bound of the scheduled time interval, wherein the elastic range upper bound is a pre-defined amount of time by which the elastic time interval is permitted to shift positively to a later time than the start time, wherein the processor is further configured to determine a first time that is between a first shift start time and the elastic range upper bound, and wherein the first shift start time is the start time, wherein the first time is the only time between the first shift start time and the first time that has a link in a TEDB that satisfies the network constraint in a first time interval from the first time for a duration from the start time to the end time, and wherein for times between the first shift start time and the first time the link does not satisfy the network constraint from each of the times for the duration, and/or wherein when no path is found from the ingress to the egress in the TEDB satisfying the network constraint in the first time interval, the processor is further configured to determine a second time that is between a second shift start time and the elastic range upper bound, and wherein the second shift start time is the first time, wherein the second time is the only time between the second shift start time and the second time that has a link in the TEDB that satisfies the network constraint in a second time interval from the second time for the duration from the start time to the end time, and wherein for times between the second shift start time and the second time the link does not satisfy the network constraint from each of the times for the duration, and determine the shortest path from the ingress to the egress in the TEDB satisfying the network constraint in the second time interval when the second time is found, and/or wherein the request further comprises a start time of the scheduled time interval, a stop time of the scheduled time interval, and an elastic lower range bound of the scheduled time interval, wherein the elastic range lower bound is a pre-defined amount of time by which the elastic time interval is permitted to shift negatively to an earlier time than the start time, wherein the processor is further configured to determine a third time that is between the elastic range lower bound and a third shift start time, wherein the third shift start time is the start time, wherein the third time is the only time between the third time and the start time that has a link in a TEDB that satisfies the network constraint in a third time interval from the third time for a duration from the start time to the stop time, and wherein for times between the third time and the start time the link does not satisfy the network constraint from each of the times for the duration, and/or wherein when no path is found from the ingress to the egress in the TEDB satisfying the network constraint in the third time interval, the processor is further configured to determine a fourth time that is between a fourth shift start time and the elastic range lower bound, wherein the fourth shift start time is the third time and the fourth time is the only time between the fourth shift start time and the fourth time that has a link in the TEDB that satisfies the network constraint in a fourth time interval from the fourth time for the duration from the start time to the stop time, wherein for times between the fourth shift start time and the fourth time the link does not satisfy the network constraint from each of the times for the duration, and determine the shortest path from the ingress to the egress in the TEDB satisfying the network constraint in the fourth time interval when the fourth time is found.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalent.

MPLS traffic engineering (MPLS TE) integrates traffic engineering (TE) capabilities into open system interconnection (OSI) model layer 3 (L3), which optimizes the routing of IP traffic, given the constraints imposed by backbone network capacity and topology. In a MPLS IF network, packets are mapped to traffic flows, forwarding paths are computed based on the traffic flow's resource requirement and available network resource, and traffic flows are transported across the network using MPLS forwarding. Examples of a traffic flow's resource requirement may include bandwidth requirements, latency tolerances, a priority versus other traffic flows, and a limit on the number of hops. In MPLS forwarding, paths are predetermined and established for particular source-destination pairs instead of forwarded on a hop-by-hop basis. The established paths are referred to as LSPs or tunnels.

Although MPLS TE enables the establishment of resource-guaranteed end-to-end LSPs or tunnels, MPLS TE LSP tunnels are not time-aware. Once an existing MPLS TE LSP tunnel is set up, the MPLS TE LSP tunnel is assumed to carry traffic indefinitely until the MPLS TE LSP tunnel is down, for example, initiated by a tear down command or caused by a link and/or node fault. When an MPLS TE LSP tunnel is established, it is assumed that the tunnel consumes its reserved network resources even though the tunnel may only use the reserved network resources for a period of time. As a result, tunnel service may not be scheduled in advance.

Figure 1:
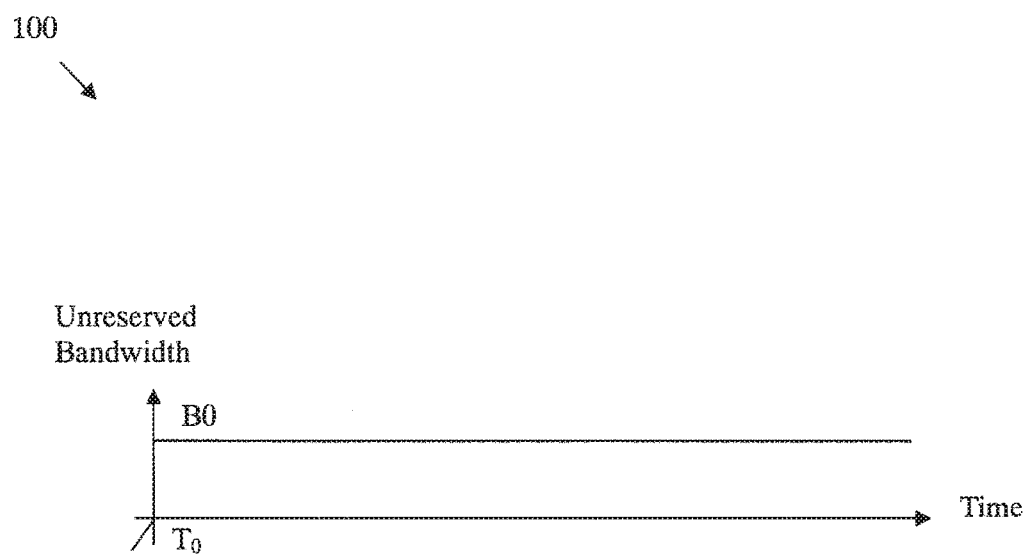
FIG. 1 is a timing diagram of an embodiment of a time agnostic link bandwidth profile.

FIG. 1 is a timing diagram of an embodiment of a time agnostic link bandwidth profile 100. The x-axis represents time in some arbitrary constant time units. The y-axis represents unreserved link bandwidth. The profile 100 shows the amount of unreserved bandwidth, denoted as B0, from the current time T0 to an indefinite end time or until there is a change to the unreserved bandwidth such as the occurrence of a next bandwidth reservation. The profile 100 does not track unreserved bandwidth by time intervals or on a time-period basis. Thus, the profile 100 is not suitable for tunnel service scheduling, which requires bandwidth reservation in advance of time intervals scheduled for a LSP to carry traffic.

Disclosed herein are various embodiments for establishing temporal LSP tunnels. A temporal LSP tunnel is a tunnel that is scheduled for carrying traffic in one or more predetermined time intervals. For example, many tunnel services are planned and scheduled. The disclosed embodiments provide mechanisms for reserving network resources for temporal tunnels during certain time intervals in advance. Thus, the disclosed embodiments enable efficient usage of network resources and allow internet service providers (ISPs) to provide service scheduling and/or service calendaring. In an embodiment, a network administrator or a user configures an ingress node of a temporal LSP with a time schedule and a network constraint for the temporal LSP to carry traffic. A time schedule may comprise one or more pre-determined time intervals each comprising a definite duration. The ingress node computes a shortest path in the network for the temporal LSP satisfying the network constraint in each time interval. The ingress node initiates the creation of the temporal LSP in a downstream direction. For example, a resource reservation protocol for traffic engineering (RSVP-TE) Path message is send to each node on the path. The Path message includes a start time of the time interval, a stop time of the time interval, and a constraint. Each node checks the availability of network resources in the each time interval that satisfies the constraint. When the Path message reaches an egress node of the temporal LSP, the egress node initiates an in-advance reservation of network resource for the temporal LSP in an upstream direction. For example, a RSVP-TE reserve (Resv) message is sent to each node on the path. Each node reserves network resource in advance for the temporal LSP in each time interval on a next hop link to a next downstream node on the path when receiving the Resv message. Downstream refers to the direction from an ingress to a destination, whereas upstream refers to the direction from a destination to a source. To tear down the temporal LSP, a requesting entity sends the ingress node a request. The requesting entity may be a network administrator, a user, an application, a switch, and a router. The ingress node initiates the tear down of the temporal LSP in a downstream direction, where a RSVP-TE PathTear message is sent to each node on the path. In one embodiment, each node reserves the network resource for a future reservation, but does not reserve a reservation for the network resource at a current time when the reservation is made. In one embodiment, each node releases the in advance reserved network resource in remaining time intervals that have not elapsed. Although the disclosed embodiments describe the in advance resource reservation mechanism in the context of bandwidths, the disclosed embodiments are may be applied to reserve any network resource in advance.

Figure 2:
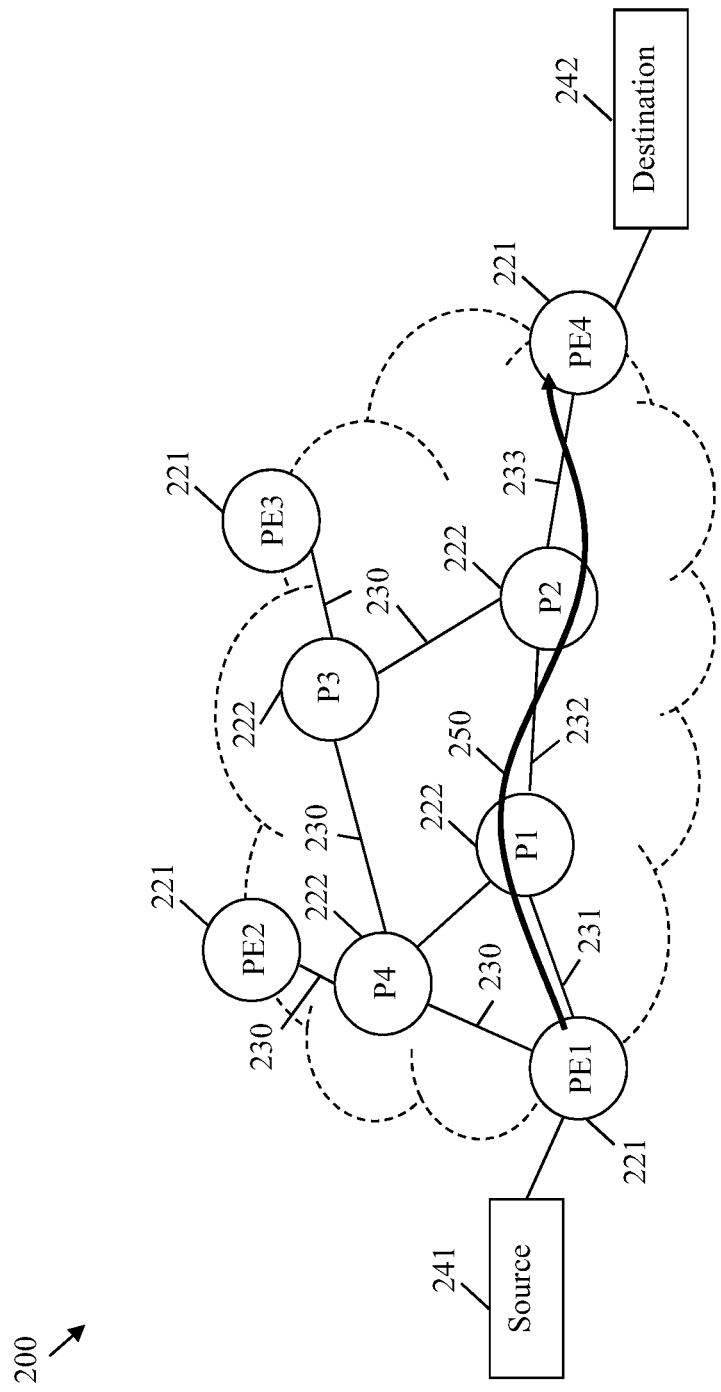
FIG. 2 is a schematic diagram of an embodiment of a network that provides TTSs.

FIG. 2 is a schematic diagram of an embodiment of a MPLS network 200 that provides TTSs. The network 200 comprises a plurality of edge nodes 221 and a plurality of internal nodes 222 interconnected by a plurality of communication links 230, 231, 232, and 233. The edge nodes 221 are shown as PE1, PE2, PE3, and PE4. The edge nodes 221 are located at an edge or a boundary of the network 200 and may be coupled to one or more nodes that are located outside the network 200. The internal nodes 222 are shown as P1, P2, P3, and P4. The internal nodes 222 are located within the network 200. The underlying physical network of the network 200 may be any type of transport network such as an electrical network and/or an optical network. The communication links 230-233 may comprise physical links such as fiber optic links, electrical links, wireless links and/or logical links used to transport data in the network 200. The network 200 may operate under a single network administrative domain or multiple network administrative domains. In an embodiment, the network 200 employs a MPLS forwarding data plane.

The edge nodes 221 and the internal nodes 222 are network devices configured to perform TTS operations in the network 200. Some examples of TTS operations include computing paths for temporal LSPs that are scheduled to carry traffic in scheduled time intervals, reserving network resource on the links 230-233 that are along the computed paths for the temporal LSPs in advance of the scheduled time intervals, setting up and tearing down temporal LSPs, and maintaining and distributing time-based TE information, as described more fully below. A LSP is a predetermined route between a source-destination pair and identified by path labels. A temporal LSP is a scheduled LSP, where network resources are reserved in advance on links 230-233 along a path of the temporal LSP according to scheduled time intervals.

As an example, the network 200 is configured with a temporal LSP 250 that is scheduled to transport data traffic for a data flow between a source 241 and a destination 242 according to a given time schedule. The source 241 is any network device configured to generate data for the data flow. The destination 242 is any network device configured to consume the data of the data flow. The temporal LSP 250 extends from the edge node PE1 221 to the edge node PE4 221, traversing through the internal nodes P1 and P2 222. The edge node PE1 221 that receives data traffic from the source 241 external to the network 200 and sends data traffic using the temporal LSP 250 in the network 200 is referred to as an ingress node of the temporal LSP 250. The edge node PE4 221 that receives data traffic from the temporal LSP 250 in the network 200 and sends data traffic to the destination 242 outside of the network 200 is referred to as an egress node of the temporal LSP 250. The internal nodes P1 and P2 222 located along a path of the temporal LSP 250 between the ingress node and the egress node are referred to as transit nodes of the temporal LSP 250. The direction from the source 241 to the destination 242 is referred to as downstream. The direction from the destination 242 to the source 241 is referred to as upstream.

In an embodiment, a requesting entity configures the edge node PE1 221, which is the ingress node of the temporal LSP 250, with a time schedule and a network constraint for the LSP 250. The requesting entity may be a network administrator, a user, an application, a switch, and a router. The time schedule comprises a series of time intervals each having a predetermined start time and a predetermined end time. Upon receiving the configuration, the edge node PE1 221 computes a shortest path in the network for the temporal LSP 250 satisfying the network constraint in each time interval. The edge node PE1 221 initiates the creation of the temporal LSP 250 in a downstream direction. To create the temporal LSP 250, each node on the path, including the edge node PE1 221 and the internal nodes P1 and P2 222, reserves a network resource in advance on a next hop link for the temporal LSP 250 in each time interval based on the network constraint. For example, the edge node PE1 221, the internal node P1 222, and the internal node P2 222 reserve network resources on the link 231, 232, and 233 in each time interval based on the network constraint, respectively. After reserving the network resources, each of the edge node PE1 221 and the internal nodes P1 and P2 222 tracks and updates remaining available or unreserved network resource on corresponding links 231-233 in each time interval, for example, in a TEDB, and distributes the updated unreserved network resource information to other edge nodes 221 and other internal nodes 222. In an embodiment, OSPF TE LSAs are extended to enable distribution of time-based TE information in the network 200. It should be noted that in some embodiments, updated unreserved network resource information is distributed when there is a significant change in the amount of unreserved network resource, for example, based on a predetermined threshold.

To facilitate subsequent data forwarding, the edge node PE4 221, the internal node P2 222, and the internal node P1 222 allocates a first label, a second label, and a third label, respectively, and notifies a next upstream node of a corresponding label. Subsequently, upon receiving a packet from the source 241, the edge node PE1 221 attaches the third label to the packet and forwards the packets to a next downstream node, which is the internal node P1 222, along the link 231. When the internal node P1 222 receives the packet, the internal node P1 222 swaps the third label with the second label and forwards the packet to a next downstream node, which is the internal node P2 222, along the link 232. When the internal node P2 222 receives the packet, the internal node P2 222 swaps the second label with the first label and forwards the packet to a next downstream node, which is the edge node PE4 221, along the link 233. When the edge node PE4 221 receives the packet, the edge node PE4 221 removes the first label and forwards the packet to the destination 242.

To tear down the temporal LSP 250, the network administrator or the user sends the edge node PE1 221 a tear-down request. The edge node PE1 221 initiates the tear down of the temporal LSP 250 in a downstream direction. Each node on the path, including the edge node PE1 221 and the internal nodes P1 and P2 222, releases the in advance reserved network resource in remaining time intervals that have not elapsed. It should be noted that although the reservation and distribution of time-based network resource are described in the context of MPLS tunnels, the network 200 may be alternatively configured as determined by a person of ordinary skill in the art to achieve similar functionalities.

Figure 3:
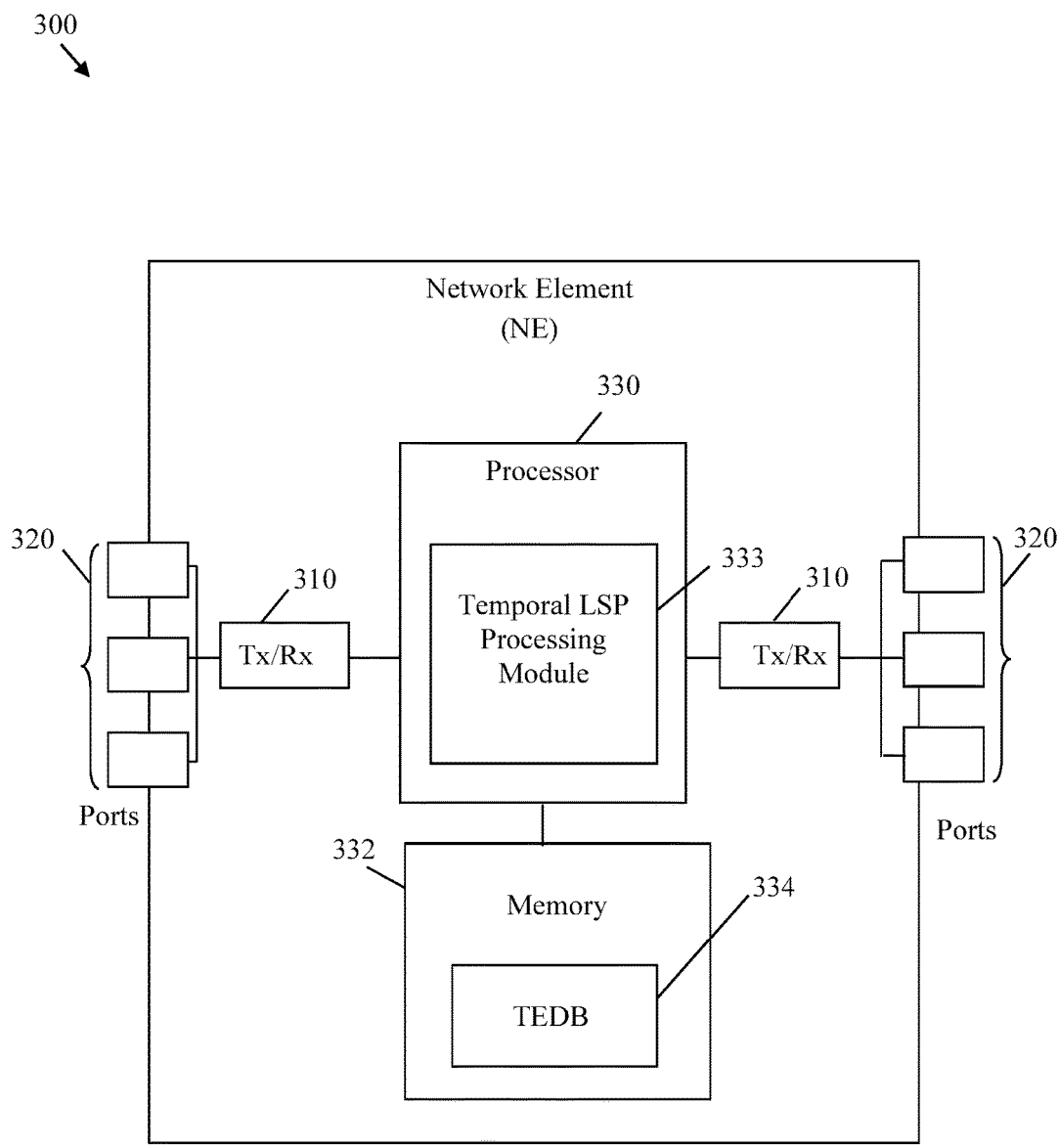
FIG. 3 is a schematic diagram of an embodiment of a NE.

FIG. 3 is a schematic diagram of an embodiment of an NE 300, such as edge nodes 221, the internal nodes 222, the source 241, and the destination 242 in a network such as the network 200. NE 300 may be configured to implement and/or support temporal tunnel creation and deletion mechanisms and schemes described herein. NE 300 may be implemented in a single node or the functionality of NE 300 may be implemented in a plurality of nodes. One skilled in the art will recognize that the term NE encompasses a broad range of devices of which NE 300 is merely an example. NE 300 is included for purposes of clarity of discussion, but is in no way meant to limit the application of the present disclosure to a particular NE embodiment or class of NE embodiments.

At least some of the features/methods described in the disclosure are implemented in a network apparatus or component such as an NE 300. For instance, the features/methods in the disclosure may be implemented using hardware, firmware, and/or software installed to run on hardware. The NE 300 is any device that transports packets through a network, e.g., a switch, router, bridge, server, a client, etc. As shown in FIG. 3, the NE 300 comprises transceivers (Tx/Rx) 310, which may be transmitters, receivers, or combinations thereof. The Tx/Rx 310 is coupled to a plurality of ports 320 for transmitting and/or receiving frames from other nodes.

A processor 330 is coupled to each Tx/Rx 310 to process the frames and/or determine which nodes to send the frames to. The processor 330 may comprise one or more multi-core processors and/or memory devices 332, which may function as data stores, buffers, etc. The processor 330 may be implemented as a general processor or may be part of one or more application specific integrated circuits (ASICs) and/or digital signal processors (DSPs).

The processor 330 comprises a temporal LSP processing module, which may perform path calculations according to the time-based TE information and may comprise means to implement the functional steps in methods 900 and 1300, as discussed more fully below, and/or any other flowcharts, schemes, and methods discussed herein. As such, the inclusion of the temporal LSP processing module 333 associated methods and systems provide improvements to the functionality of the NE 300. Further, the temporal LSP processing module 333 effects a transformation of a particular article (e.g., the network) to a different state. In an alternative embodiment, the temporal LSP processing module 333 may be implemented as instructions stored in the memory device 332, which may be executed by the processor 330.

The memory device 332 may comprise a cache for temporarily storing content, e.g., a random-access memory (RAM). Additionally, the memory device 332 may comprise a long-term storage for storing content relatively longer, for example, a read-only memory (ROM). For instance, the cache and the long-term storage may include dynamic RAMs (DRAMs), solid-state drives (SSDs), hard disks, or combinations thereof. The memory device 332 may be configured to store one or more time-based TEDBs 334, as discussed more fully below.

It is understood that by programming and/or loading executable instructions onto the NE 300, at least one of the processor 330 and/or memory device 332 are changed, transforming the NE 300 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable and that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions (e.g., a computer program product stored in a non-transitory medium/memory) may be viewed as a particular machine or apparatus.

Figure 4:
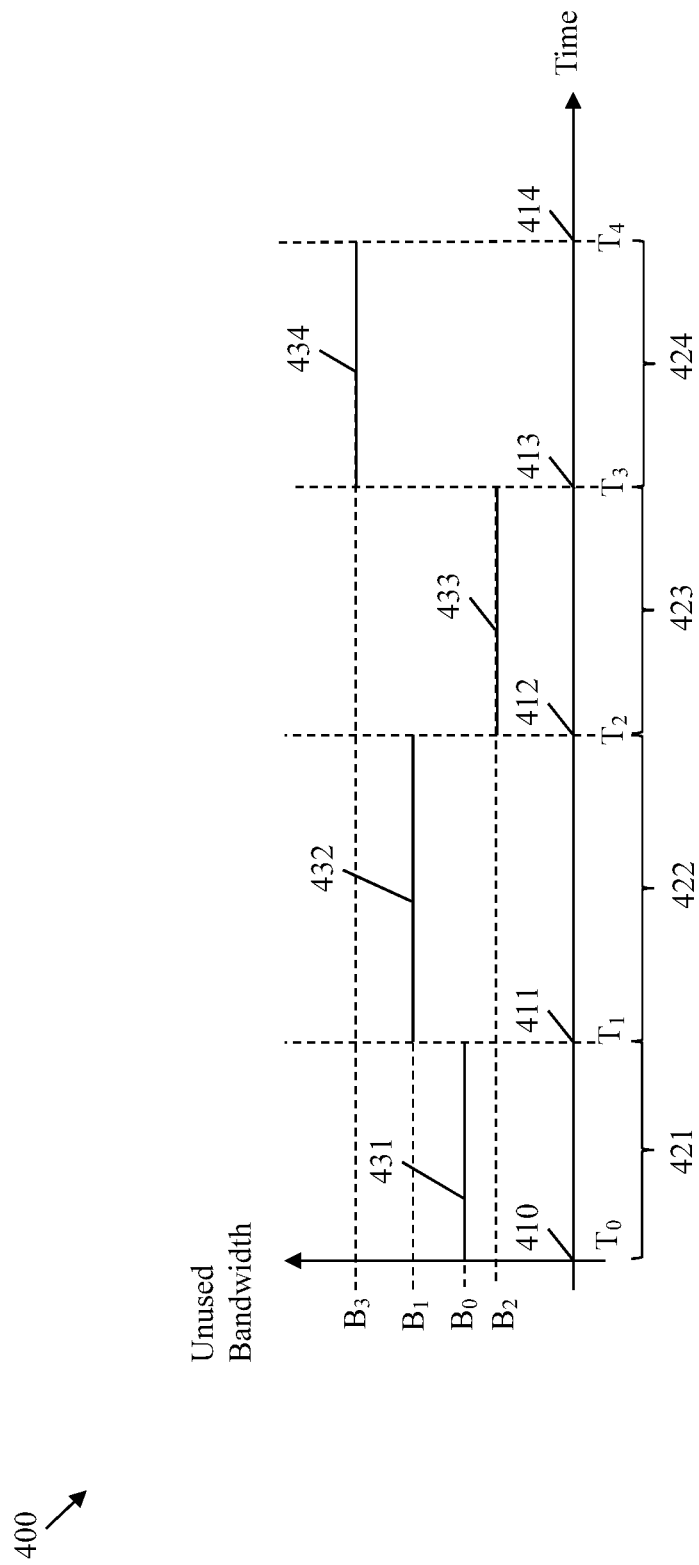
FIG. 4 is a timing diagram of an embodiment of a time-based link bandwidth profile.

FIG. 4 is a timing diagram of an embodiment of a time-based link bandwidth profile 400. The x-axis represents time in some arbitrary constant time units. The y-axis represents unreserved bandwidth. The profile 400 corresponds to time-based TE information maintained by the edge nodes 221, the internal nodes 222, and the NE 300, for example, in a time-based TEDB such as the time-based TEDB 334. The profile 400 shows unreserved bandwidth at a certain priority level on a link such as the links 230-233 in a network such as the network 200 as a function of time, which includes a series of time intervals 421, 422, 423, and 424. As shown, the amount of unreserved bandwidth 431 at the time interval 421 from a time 410, denoted as $T_0$, to a time 411, denoted as $T_1$, is $B_0$. The amount of unreserved bandwidth 432 at the time interval 422 from the time 411 to a time 412, denoted as $T_2$, is $B_1$. The amount of unreserved bandwidth 433 at the time interval 423 from the time 412 to a time 413, denoted as $T_3$, is $B_2$. The amount of unreserved bandwidth 434 at the time interval 424 from the time 413 to a time 414, denoted as $T_4$, is $B_3$.

In one embodiment, the profile 400 is recorded in a time-based TEDB using absolute time as shown below:

$[T_0, B_0], [T_1, B_1], [T_2, B_2], [T_3, B_3]$, where $T_0$, $T_1$, $T_2$, and $T_3$ are global clock times in the network synchronized among all nodes in the network.

In another embodiment, the profile 400 is recorded in a time-based TEDB using relative time as shown below:

$[P_0, B_0], [P_1, B_1], [P_2, B_2], [P_3, B_3]$, where $P_0$, $P_1$, $P_2$, and $P_3$ represent durations of the time intervals 421, 422, 423, and 424, respectively, and $P_0$ begins at a current time $T_0$. When using relative time representations, a node may use a local clock time, which may be different from another node in the network. One approach to implementing the profile 400 is to configure a timer to expire at a unit time (e.g., at every second) and use a period variable, denoted as P, to track the expiration of the time intervals 421-424. For example, at time 410, P is set to a duration or a period (e.g., $P_0$) of the time interval 421 according to the unit time. When the timer expires, P is decremented by the unit time and the duration or period (e.g., $P_0$) of a corresponding time interval in the time-based TEDB is updated by P. The expiration of the timer indicates the unit time has elapsed. When P reaches a value of 0, P is set to a duration or a period (e.g., $P_1$) of a next time interval, which is the time interval 422.

Figure 5:
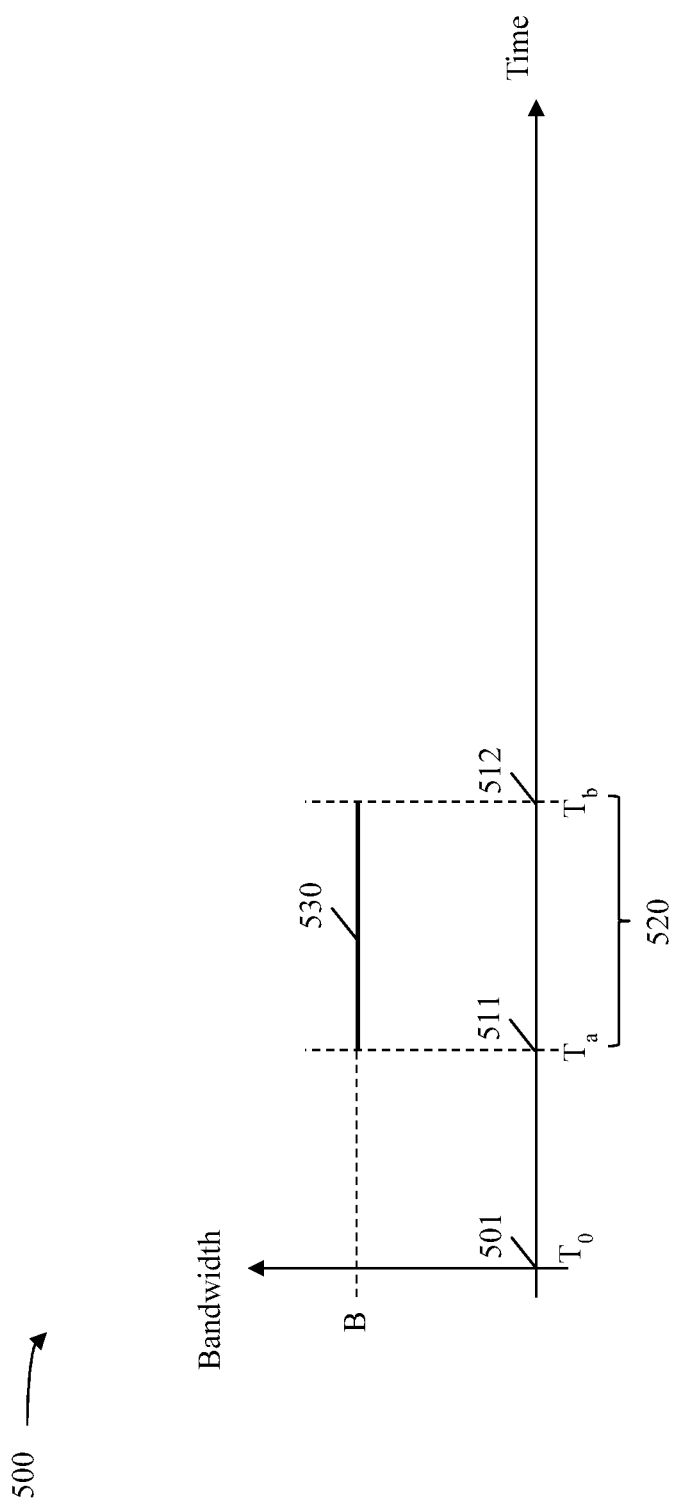
FIG. 5 is a timing diagram of an embodiment of a temporal bandwidth reservation scheme with a recurrent time interval.

In some other embodiments, the profile 400 is recorded in a time-based TEDB using a combination of absolute time and relative time as shown below:

$T_0, [P_0, B_0], [P_1, B_1], [P_2, B_2], [P_3, B_3]$, where $P_0$, $P_1$, $P_2$, and $P_3$ represent durations of the time intervals 421, 422, 423, and 424, respectively, and $T_0$ represents a start time of the series of time intervals 421-424. The time $T_0$ is an absolute time, which is a global clock time of the network synchronized among all nodes in the network FIG. 5 is a timing diagram of an embodiment of a temporal bandwidth reservation scheme 500. In the scheme 500, the x-axis represents time in some arbitrary units of time and the y-axis represents bandwidth in some arbitrary units of bandwidth. The scheme 500 is implemented by an NE such as the edge nodes 221, the internal nodes 222, and the NE 300 to reserve a bandwidth for an LSP, such as the LSP 150. For example, at a current time 501, denoted as $T_0$, a requesting entity may send a request message to a NE to request path computation for an LSP in a time interval 520 according to certain network constraints including a constraint for a bandwidth 530 in an amount of B. The requesting entity may be a network administrator, a user, an application, a switch, and a router. In response to the request message, the NE computes a path for the LSP satisfying the network constraints and reserves the bandwidth 530 for the LSP in the requested time interval 520. Subsequently, the LSP is configured is to carry traffic in the time interval 520. As shown, the time interval 520 starts at a time 511, denoted as $T_a$, and ends at a time 512, denoted as $T_b$. Thus, a time schedule for the scheme 500 may be represented as $[T_a, T_b]$. A time schedule may be included in the request message by indicating an absolute time for the time 511, an absolute time for the time 512, a relative time for the time 511, a relative time for the time 512, a duration of the time interval 520, or combinations thereof, as described more fully below. It should be noted that although the scheme 500 illustrates scheduling mechanisms for bandwidth reservation, the scheme 500 may be employed for reserving other types of network resources, such as wavelengths, for the LSP.

Figure 6:
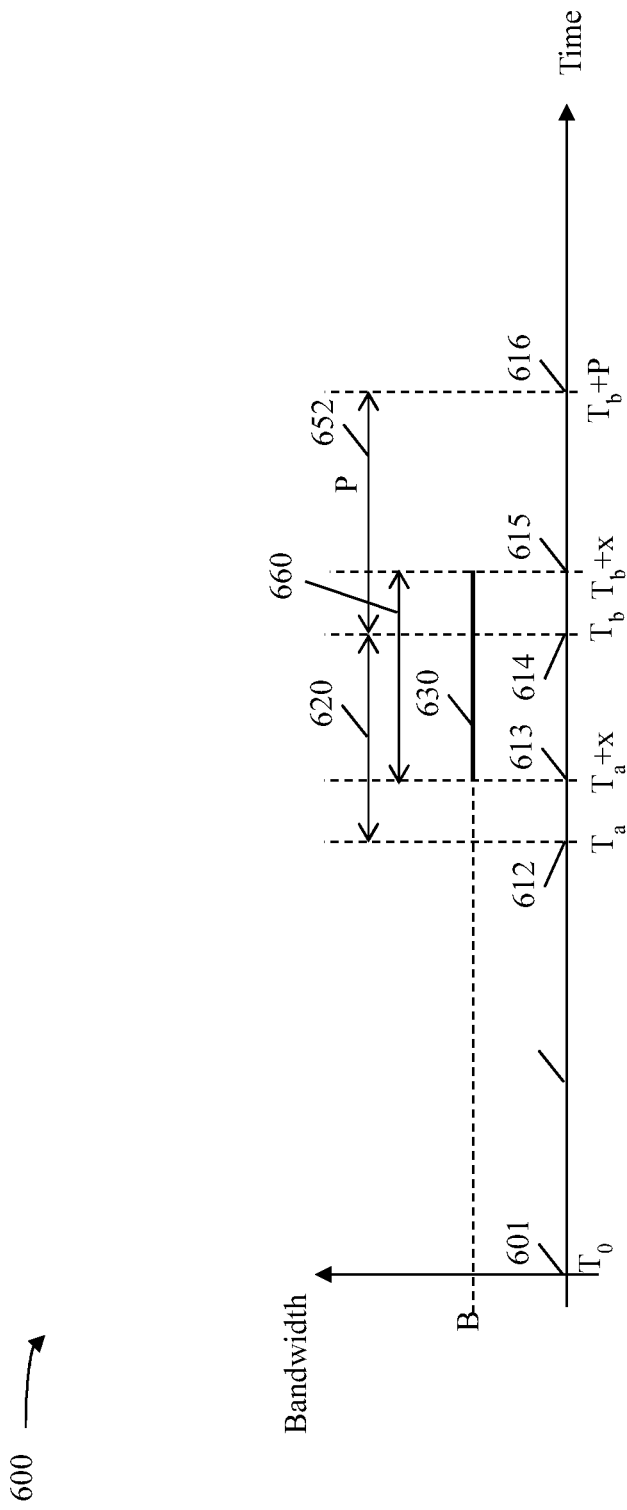
FIG. 6 is a timing diagram of an embodiment of a temporal bandwidth reservation scheme with an elastic time range.

FIG. 6 is a timing diagram of an embodiment of a temporal bandwidth reservation scheme 600 with an elastic time range that is permitted to shift to positively by a pre-defined amount. In the scheme 600, the x-axis represents time in some arbitrary units of time and the y-axis represents bandwidth in some arbitrary units of bandwidth. The scheme 600 is implemented by an NE such as the edge nodes 221, the internal nodes 222, and the NE 300 to reserve a bandwidth for an LSP, such as the LSP 150. The scheme 600 is similar to the scheme 500, but reserves bandwidth in a time interval 620 with a positively elastic time range that is permitted to shift positively to the right by a pre-defined amount. For example, at a current time 601, denoted as $T_0$, the requesting entity may send a request message to a NE to request path computation for an LSP in a time interval 620 with a positively elastic time range according to certain network constraints including a constraint for a bandwidth 630 in an amount of B. The positively elastic time range may be represented by an elastic range upper bound 652, denoted as P. For example, the elastic range upper bound 652 may comprise time durations of about 300 seconds. In response to the request message, the edge node may compute a path for the LSP satisfying the bandwidth 630 constraint and reserves a bandwidth 630 for the LSP as close to the requested time interval 620 as possible bounded by the elastic range upper bound 652. Subsequently, the LSP is configured to carry traffic in a shifted time interval 660. As shown, the requested time interval 620 spans a time duration between a time 612, denoted as $T_a$, and a time 614, denoted as $T_b$. However, the scheme 600 allows the bandwidth to be reserved ending at a time 616, denoted as $T_b+P$. As shown, a bandwidth 630 is reserved between a shifted start time 613, denoted as $T_a+x$, and a shifted end time 615, denoted as $T_b+x$, where x satisfies the elastic range upper bound 652. Thus, a time schedule for the scheme 600 may be represented as shown below:

[$T_a+x$, $T_b+x$], where $0 \le x \le P$ and x represents a minimum amount of time from 0 to P that is required to shift requested time interval 620 to the right to satisfy the requested constraints.

The requesting entity may include the time schedule in the request message by indicating an absolute time for the time 612, an absolute time for the time 614, a relative time for the time 612, a relative time for the time 614, a duration of the interval 620, a duration of the elastic range upper bound 652 (P), or combinations thereof, as described more fully below. It should be noted that although the scheme 600 illustrates scheduling mechanisms for bandwidth reservation, the scheme 600 may be employed for reserving other types of network resources, such as wavelengths, for LSPs.

Figure 7:
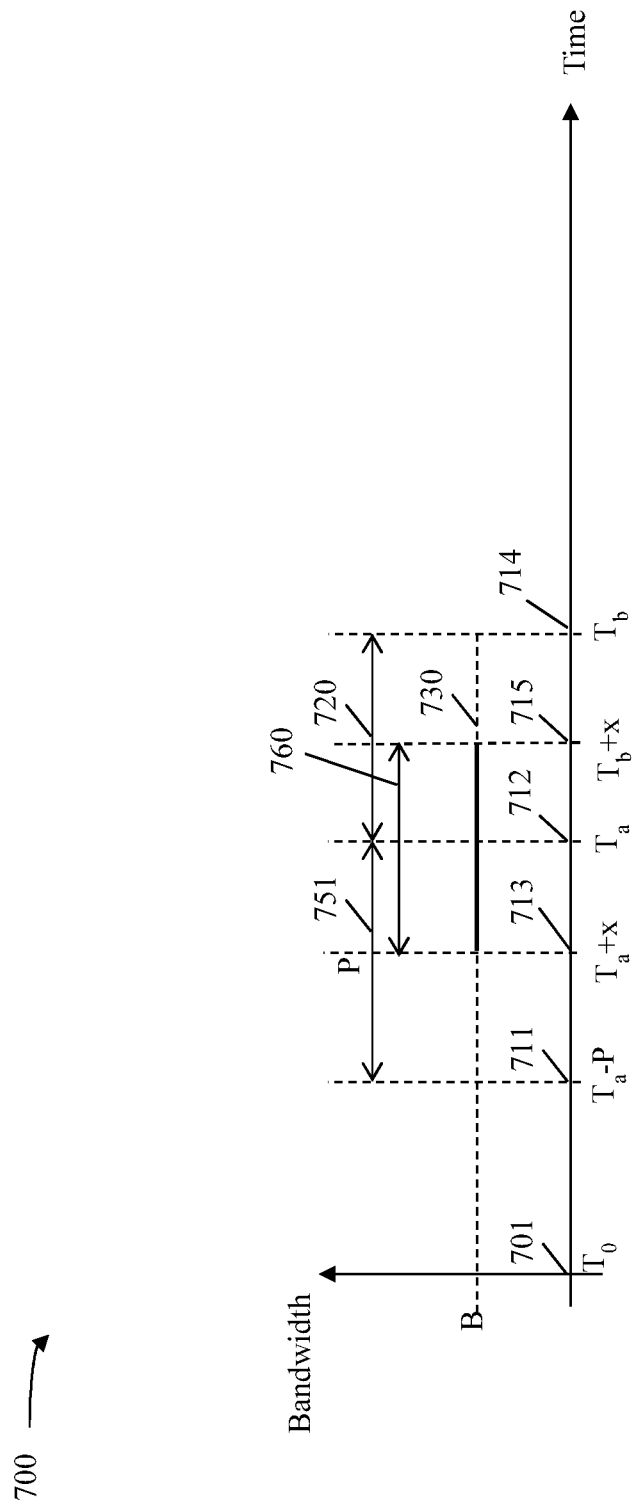
FIG. 7 is a timing diagram of an embodiment of a temporal bandwidth reservation scheme with graceful periods.

FIG. 7 is a timing diagram of an embodiment of a temporal bandwidth reservation scheme 700 with an elastic time range that is permitted to shift to the left by a pre-defined amount. In the scheme 700, the x-axis represents time in some arbitrary units of time and the y-axis represents bandwidth in some arbitrary units of bandwidth. The scheme 700 is implemented by an NE such as the edge nodes 221, the internal nodes 222, and the NE 300 to reserve a bandwidth for an LSP, such as the LSP 150. The scheme 700 is similar to the scheme 600, but reserves bandwidth in a time interval 720 with a negatively elastic time range that is permitted to shift negatively by a pre-defined amount. For example, at a current time 701, denoted as $T_0$, the requesting entity may send a request message to an NE to request path computation for an LSP in a time interval 720 with a negatively elastic time range according to certain network constraints including a constraint for a bandwidth 730 in an amount of B. The negatively elastic time range may be represented by an elastic range lower bound 751, denoted as P. For example, the elastic range lower bound 751 may comprise time durations of about 300 seconds. In response to the request message, the edge node may compute a path for the LSP satisfying the bandwidth 730 constraint and reserves a bandwidth 730 for the LSP as close to the requested time interval 720 as possible bounded by the elastic range lower bound 751. Subsequently, the LSP is configured to carry traffic in a shifted time interval 760. As shown, the requested time interval 720 spans a time duration between a time 712, denoted as $T_a$, and a time 714, denoted as $T_b$. However, the scheme 700 allows the bandwidth to be reserved beginning at a time 711, denoted as $T_a-P$. As shown, a bandwidth 730 is reserved between a shifted start time 713, denoted as $T_a+x$, and a shifted end time 715, denoted as $T_b+x$, where x satisfies the elastic range lower bound 751. Thus, a time schedule for the scheme 700 may be represented as shown below:

[$T_a+x$, $T_b+x$], where $-P \le x \le 0$ and x represents a minimum amount of time from −P to 0 that is required to shift requested time interval 720 in order to satisfy the requested constraints.

The requesting entity may include the time schedule in the request message by indicating an absolute time for the time 712, an absolute time for the time 714, a relative time for the time 712, a relative time for the time 714, a duration of the time interval 720, a duration of the elastic range lower bound 751 (P) or combinations thereof, as described more fully below. It should be noted that although the scheme 700 illustrates scheduling mechanisms for bandwidth reservation, the scheme 700 may be employed for reserving other types of network resources, such as wavelengths, for LSPs.

Figure 8:
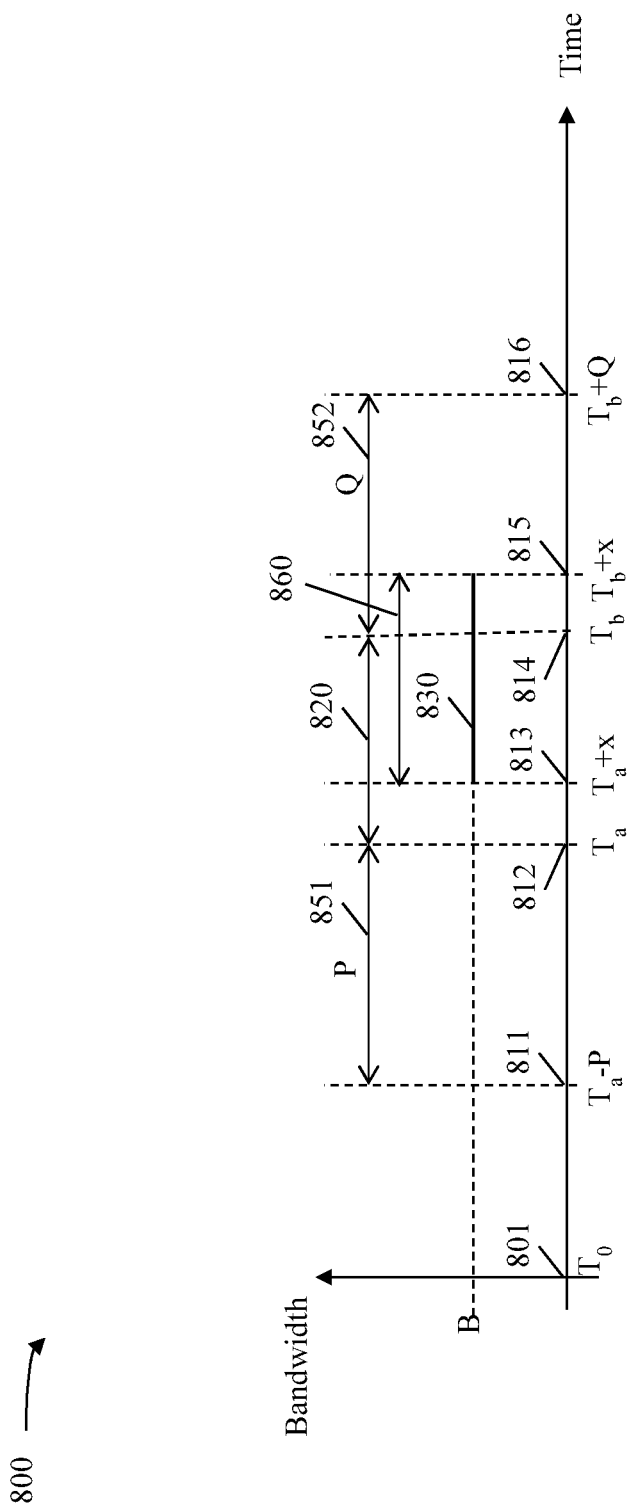
FIG. 8 is a timing diagram of an embodiment of a link bandwidth profile.

FIG. 8 is a timing diagram of an embodiment of a temporal bandwidth reservation scheme 800 with an elastic time range that is permitted to shift to the left and right by a pre-defined amount. In the scheme 800, the x-axis represents time in some arbitrary units of time and the y-axis represents bandwidth in some arbitrary units of bandwidth. The scheme 800 is implemented by an NE such as the edge nodes 221, the internal nodes 222, and the NE 300 to reserve a bandwidth for an LSP, such as the LSP 150. The scheme 800 is similar to the schemes 600 and 700, but reserves bandwidth in a time interval 820 with a negatively and positively elastic time range that is permitted to shift negatively and positively by a pre-defined amount. For example, at a current time 801, denoted as $T_0$, a requesting entity may send a request message to an NE to request path computation for an LSP in a time interval 820 with a negatively and/or positively elastic time range according to certain network constraints including a constraint for a bandwidth 830 in an amount of B. The negatively elastic time range may be represented by an elastic range lower bound 851, denoted as P, and the positively elastic time range may be represented by an elastic range upper bound 852, denoted as Q. For example, the elastic range lower bound 851 and the elastic range upper bound 852 may comprise time durations of about 300 seconds. In response to the request message, the NE computes a path for the LSP satisfying the bandwidth 830 constraint and reserves a bandwidth 830 for the LSP as close to the requested time interval 820 as possible bounded by the elastic range lower bound 851 and the elastic range upper bound 852. Subsequently, the LSP is configured to carry traffic in a shifted time interval 860. As shown, the requested time interval 820 spans a time duration between a time 812, denoted as $T_a$, and a time 814, denoted as $T_b$. However, the scheme 800 allows the bandwidth to be reserved beginning at a time 811, denoted as $T_a-P$, or ending at a time 816, denoted as $T_b+Q$. As shown, a bandwidth 830 is reserved between a shifted start time 813, denoted as $T_a+x$, and a shifted end time 815, denoted as $T_b+x$, where x satisfies the elastic range lower bound 851 and the elastic range upper bound 852. Thus, a time schedule for the scheme 800 may be represented as shown below:

[$T_a+X, T_b+X$], where $-P \le x \le Q$ and x represents a minimum amount of time from $-P$ to $Q$ that is required to shift requested time interval 820 in order to satisfy the requested constraints.

The requesting entity may include the time schedule in the request message by indicating an absolute time for the time 812, an absolute time for the time 814, a relative time for the time 812, a relative time for the time 814, a duration of the time interval 820, a duration of the elastic range lower bound 851, a duration of the elastic range upper bound 852, or combinations thereof, as described more fully below. It should be noted that although the scheme 800 illustrates scheduling mechanisms for bandwidth reservation, the scheme 800 may be employed for reserving other types of network resources, such as wavelengths, for LSPs.

FIGS. 9A-D are flowcharts of an embodiment of a temporal tunnel service method 900. The method 900 is implemented by an NE such as the edge nodes 221, the internal nodes 222, and the NE 300. The method 900 is implemented when creating a temporal LSP, such as LSP 150, according to a given time interval. At step 905, a request for creating a temporal LSP in a time interval is received, for example, from a requesting entity. The temporal LSP may be a P2P LSP or a P2MP LSP. The request may indicate an ingress node such as edge node 221 PE1, an egress node such as edge node 221 PE4, a time interval from a first time, such as the times 511, 612, 712, and 812, to a second time, such as the times 512, 614, 714, and 814. The start time and/or the end time may be represented as absolute times and/or relative times. In addition, the request may indicate an elastic range with an elastic range lower bound, such as the elastic range lower bounds 751 and 851, and an elastic range upper bound, such as the elastic range upper bounds 652 and 852.

At step 907, a shortest path from the ingress node to the egress node in a network, such as the network 200, satisfying a constraint in the time interval is computed, for example, by employing a CSPF algorithm. The constraint may include bandwidth, wavelengths, delays, QoS, and number of hops. For example, the NE is configured to compute paths in a single AS domain, such as the domains 240. Thus, the computed shortest path may span a segment of the LSP within the AS domain of the NE. When the time interval is a recurrent time interval, the shortest path is computed such that the shortest path satisfies the constraint in each recurring time interval.

At decision diamond 910, it may be determined whether a path is found from the ingress node to the egress node in the network. For example, the NE may be configured to determine whether a path is found from the ingress node to the egress node in the time interval. At block 915, if a path is found that satisfies the constraints and the time interval, the path and an indication that the path has been found may be returned. For example, the NE may notify the requesting entity that a path satisfying the constraints within the time interval has been found. A bandwidth may be reserved for the LSP along the shortest path found in the time interval. The bandwidth is reserved from a TEDB on each of the links along the shortest path computed for the LSP.

At decision diamond 920, if a path is not found that satisfies the constraints within the time interval, then it may be determined whether the time interval is elastic. For example, the NE may determine whether the time interval is elastic based on the request, which includes an indication of an elastic time range. At block 925, if it is determined that the time interval is not elastic, then an indication that a path cannot be found may be returned. For example, the NE may determine whether the request indicates an elastic range upper bound or an elastic range lower bound. If the request does not indicate either an elastic range upper bound or an elastic range lower bound, the NE may notify the requesting entity that a path satisfying the constraints within the time interval has not been found.

At decision diamond 940, it may be determined whether the time interval is only positively elastic within an elastic range upper bound. For example, the NE may determine that the request only indicates an elastic range upper bound. In this case, the method proceeds to circle A, which is described below in more detail with regard to FIG. 9A below. If it is determined that the time interval is not solely positively elastic, at decision diamond 950, it may be determined whether the time interval is only negatively elastic within an elastic range lower bound. For example, the NE may determine that the request only indicates an elastic lower range bound. In this case, the method proceeds to circle B, which is described in more detail below with regard to FIG. 9B. If it is determined that the time interval is not solely positively elastic or solely negatively elastic, at decision diamond 960, it may be determined whether the time interval is positively and negatively elastic with an elastic range upper bound and an elastic range lower bound. For example, the NE may determine that the request indicates both an elastic range upper bound and an elastic range lower bound. In this case, the method proceeds to circle C, which is described in more detail below with regard to FIG. 9C.

Figure 9A:
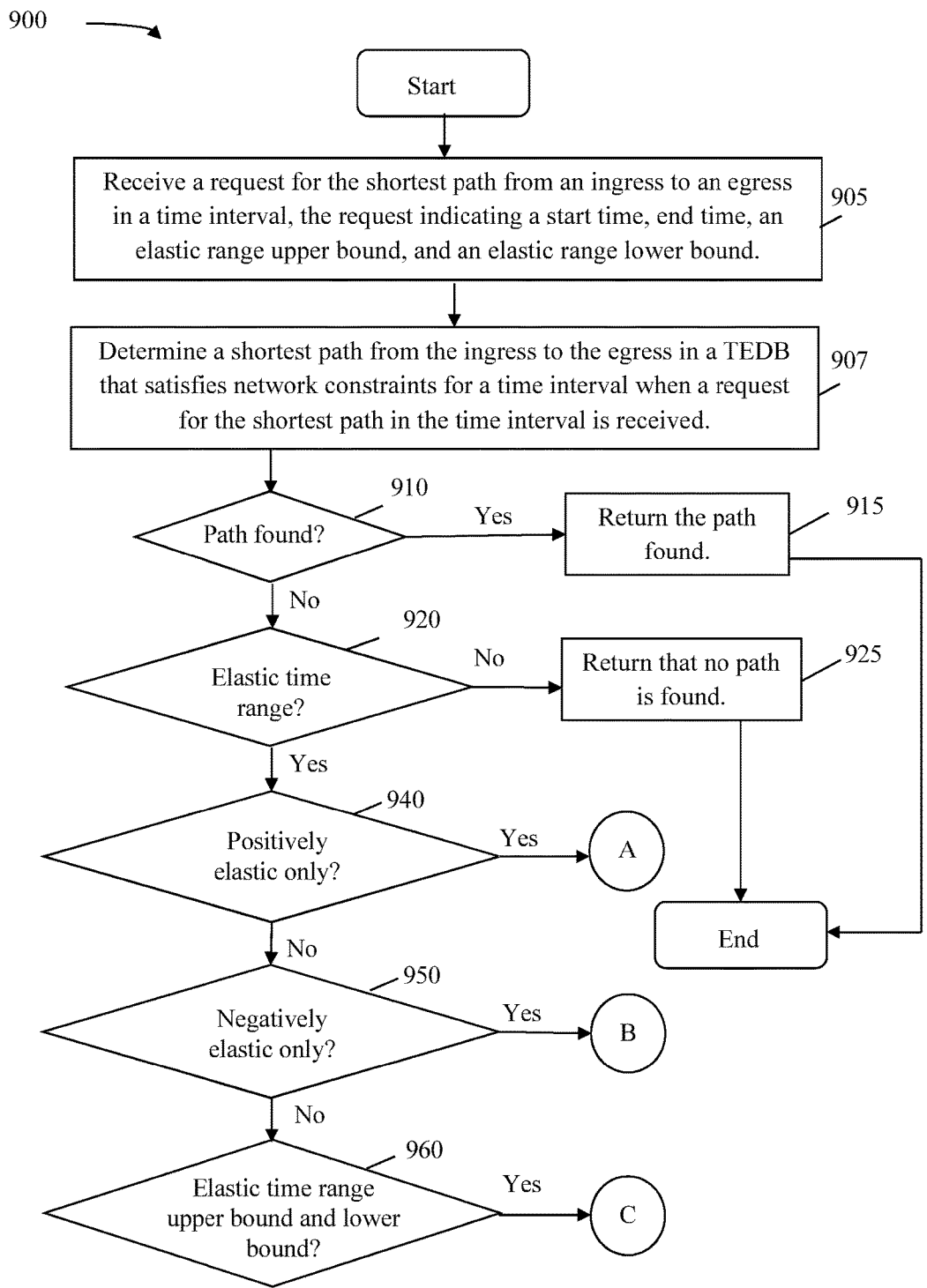
FIG. 9A is a flowchart of an embodiment of a temporal LSP creation method.
Figure 9B:
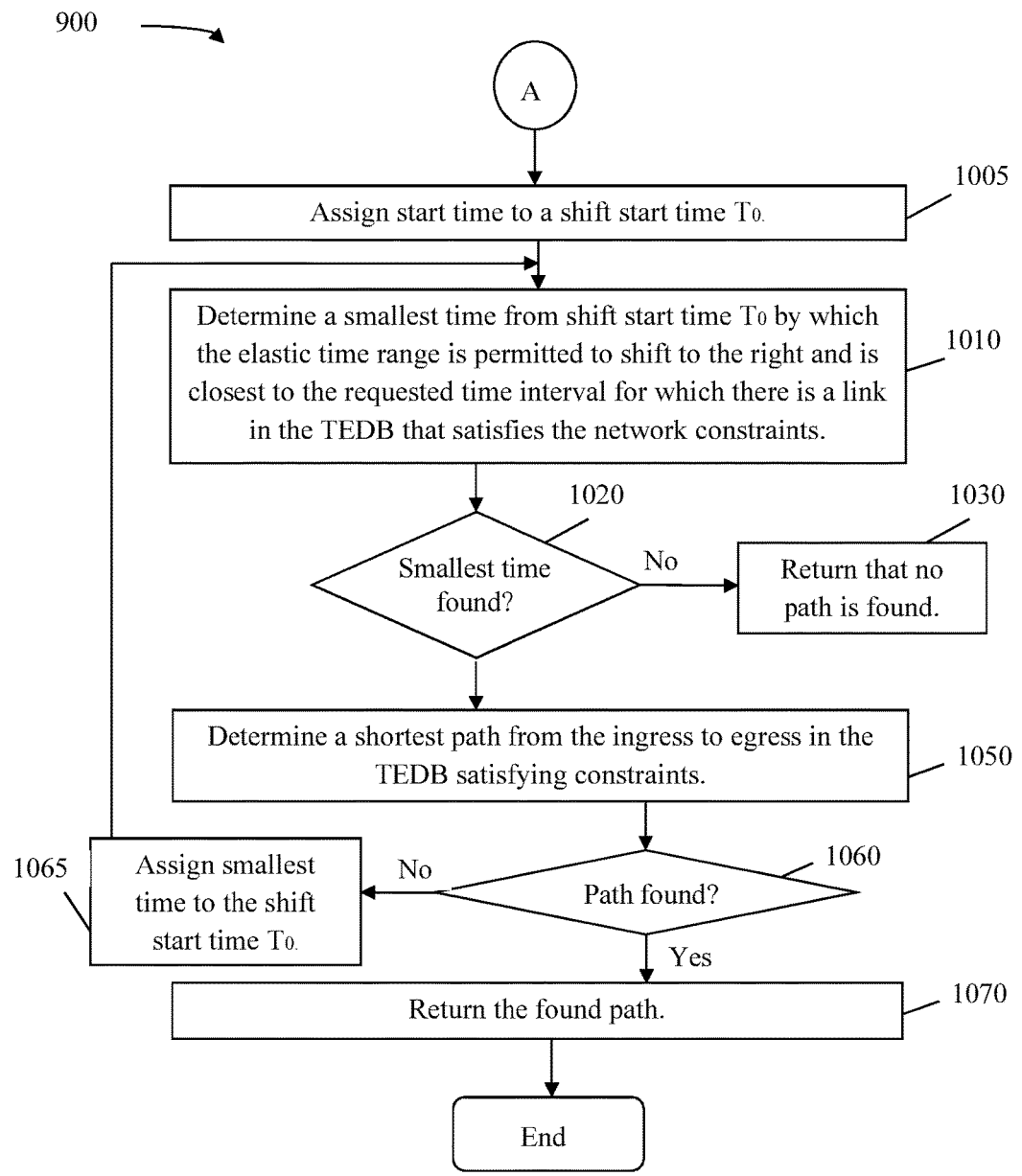
FIG. 9B is a flowchart of an embodiment of a temporal LSP creation method with a positively elastic time range.

At block 1005 of FIG. 9B, the start time $T_a$ is assigned to a shift start time $T_0$. At block 1010, a smallest time (T) that is greater than the shift start time To and less than or equal to the elastic range upper bound ($T_a+P$), such as the elastic range upper bound 652, for which there is a link in the TEDB that satisfies the constraints in the time interval from T to $T+(T_b-T_a)$ and does not satisfy the constraints in a time interval from $T_1$ to $T_1+(T_b-T_a)$ for any time ($T_1$) from $T_0<T_1<T$ is determined. The smallest time T may be represented as $T_0<T<=T_a+P$. The smallest time T is the time that is the closest to the requested time interval that satisfies the network constraints. The times that are greater than the shift start time and less than the smallest time T do not satisfy network constraints. For example, the NE may traverse all the links in the TEDB and find a smallest time $L_i$ for each of the links that satisfies the network constraints such as the bandwidth constraint in the time interval from $L_i$ to $L_i+(T_b-T_a)$ and does not satisfy the network constraints such as the bandwidth constraint in the time interval from $K_i$ to $K_i+(T_b-T_a)$ for any $K_i$ from $T_0<K_i<L_i$. The smallest time T is the smallest one among all $L_i$.

At decision diamond 1020, it is determined whether a smallest time T is found within the positively elastic time range. For example, the NE may compute a smallest time within the positively elastic time range that satisfies the network constraints. At block 1030, if it is determined that a time within the positively elastic time range that satisfies the network constraints does not exist, then an indication that a path cannot be found is returned. For example, if the NE cannot determine a time within the positively elastic time range that satisfies the network constraints, then the NE notifies the requesting entity that a path cannot be found. The NE may send a path computation response to the requesting entity indicating that a path for the LSP satisfying the network constraint in the scheduled time interval cannot be found.

If the smallest time T is found, then at block 1050, a shortest path in a network, such as the network 200, from the ingress node to the egress node satisfying the requested constraints in the time interval from T to $T+(T_b-T_a)$ is computed, for example, by employing a CSPF algorithm. The constraint may include bandwidth, wavelengths, delays, QoS, and number of hops. For example, the NE is configured to compute paths in a single AS domain, such as the domains 240. Thus, the computed shortest path may span a segment of the LSP within the AS domain of the NE.

At decision diamond 1060, it may be determined whether a shortest path in the network that satisfies the requested constraints in the time interval from T to $T+(T_b-T_a)$ is found. At block 1070, a path may be successfully computed, and the smallest time T and an indication of the path may be returned. For example, the NE may successfully find the shortest path in the network that satisfies the requested constraints. The NE may notify the requesting entity of the computed shortest path and the smallest time T. From the time T, the time interval from T to $T+(T_b-T_a)$ is obtained, which is called a shifted time interval. For example, the NE may transmit a path computation response to the requesting entity indicating a path for the LSP satisfying the network constraint in the shifted time interval and an in-advance reservation of network resource along the path for the LSP in the shifted time interval. At block 1065, no path can be computed in the network that satisfies the requested constraints in the time interval from T to $T+(T_b-T_a)$. In this case, the smallest time T found is assigned to the shift start time To. With this new shift start time, the method returns to block 1010 and repeats the steps in blocks 1010-1030 or 1010-1070 until the method reaches block 1070 or block 1030.

Figure 9C:
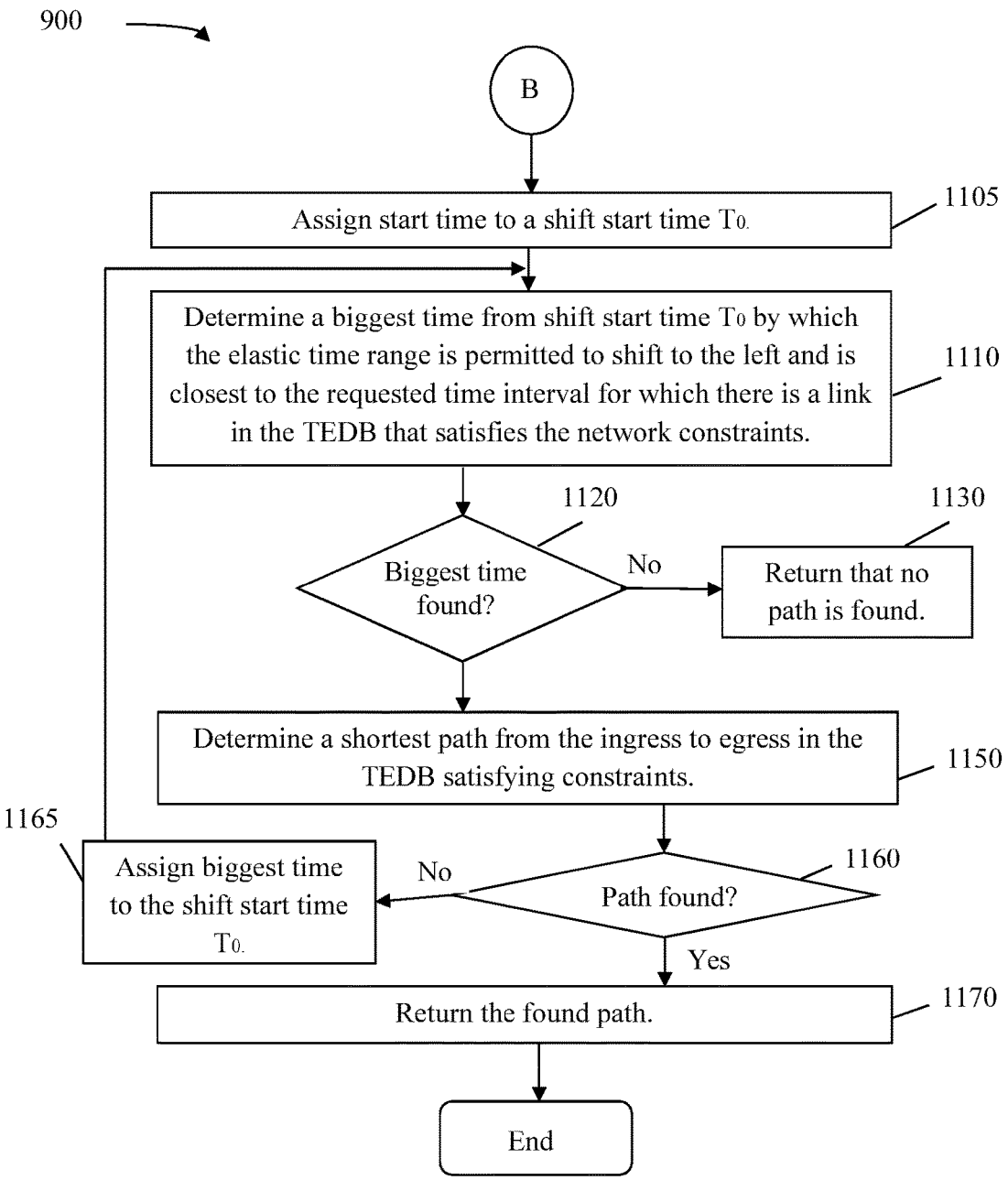
FIG. 9C is a flowchart of an embodiment of a temporal LSP creation method with a negatively elastic range.

At block 1105 of FIG. 9C, the start time $T_a$ is assigned to a shift start time $T_0$. At block 1110, a biggest time (T) that is greater than elastic range lower bound and less than the shift start time, for which there is a link in the TEDB that satisfies the constraints in the time interval from T to $T+(T_b-T_a)$ and does not satisfy the constraints in a time interval from $T_1$ to $T_1+(T_b-T_a)$ for any time ($T_1$) from $T<T_1<T_0$ is determined. The biggest time T may be represented as $T_a-P<=T<T_0$. That is, the biggest time T is the time that is the closest the requested time interval that satisfies the network constraints. The times that are greater than T do not satisfy the network constraints. For example, the NE may traverse all the links in the TEDB and find a biggest time $L_i$ for each of the links that satisfies the constraints such as the bandwidth constraint in the time interval from $L_i$ to $L_i+(T_b-T_a)$ and does not satisfy the constraints such as the bandwidth constraint in the time interval from $K_i$ to $K_i+(T_b-T_a)$ for any $K_i$ from $L_i<K_i<T_0$. The biggest time T is the biggest one among all $L_i$.

At decision diamond 1120, it is determined whether a biggest time T is found within the negatively elastic time range. At block 1130, if it is determined that a time within the negatively elastic time range that satisfies the constraints does not exist, then an indication that a path cannot be found is returned. For example, if the NE cannot determine a time within the negatively elastic time range that satisfies the network constraints, then the NE notifies the requesting entity that a path cannot be found.

At block 1150, a shortest path in a network, such as the network 200, from the ingress node to the egress node satisfying the constraints in the time interval from T to $T+(T_b-T_a)$ is computed, for example, by employing a CSPF algorithm. The constraint may include bandwidth, wavelengths, delays, QoS, and number of hops. For example, the NE is configured to compute paths in a single AS domain, such as the domains 240. Thus, the computed shortest path may span a segment of the LSP within the AS domain of the NE.

At decision diamond 1160, it may be determined whether a shortest path in the network that satisfies the requested constraints in the time interval from T to $T+(T_b-T_a)$ is found. At block 1070, a path may be successfully computed, and the biggest time T and an indication of the path may be returned. For example, the NE may successfully find the shortest path in the network that satisfies the requested constraints. The NE may notify the requesting entity of the computed shortest path and the biggest time T. From the time T, the shifted time interval from T to $T+(T_b-T_a)$ is obtained. For example, the NE may transmit a path computation response to the requesting entity indicating a path for the LSP satisfying the network constraint in the shifted time interval and an in-advance reservation of network resource along the path for the LSP in the shifted time interval. At block 1165, no path can be computed in the network that satisfies the requested constraints in the time interval from T to $T+(T_b-T_a)$. In this case, the biggest time T found is assigned to the shift start time To. With this new shift start time, the method returns to block 1110 and repeats the steps in block 1110-1130 or 1110-1170 until the method reaches block 1170 or block 1130.

Figure 9D:
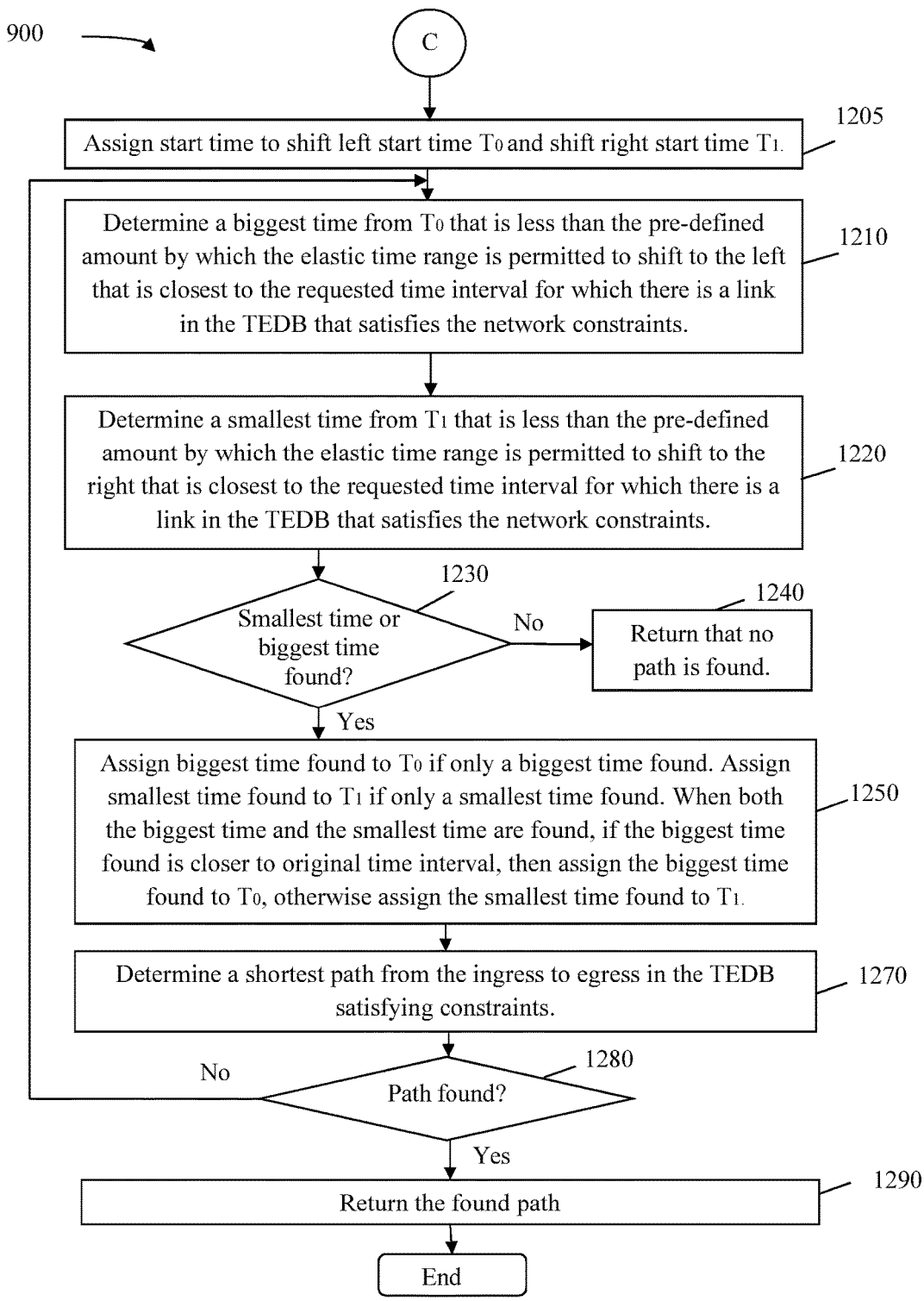
FIG. 9D is a flowchart of an embodiment of a temporal LSP creation method with a positively and negatively elastic time range.

At block 1205 of FIG. 9D, the start time $T_a$ is assigned to a shift left start time To and shift right start time $T_1$. At block 1210, a biggest time $T_c$ may be determined in a manner similar to which is described with regard to block 1110, which is directed to determining a biggest time in a negatively elastic time interval. The biggest time $T_c$ may be represented as $(T_a-P)<=T_c<T_0$. The biggest time $T_c$ is the closest time to the originally requested time interval that satisfies the constraints. At block 1220, the smallest time $T_d$ may be determined in a manner similar to that which is described with regard to block 1010, which is directed to determining a smallest time in a positively elastic time interval. The smallest time $T_d$ may be represented as $T_1<T_d<=T_a+Q$. The smallest time $T_d$ is the closest time to the originally requested time interval that satisfies the constraints.

At decision diamond 1230, it is determined whether a biggest time $T_c$ or a smallest time $T_d$ is found within the elastic time range. At block 1240, a biggest time $T_c$ or a smallest time $T_d$ may not be found within the elastic time range. In such a case, the NE may return an indication to the requesting entity that a path cannot be found within the elastic time range specified by the request. At block 1250, the time T that is the closest to the originally requested time intervals may be determined. For example, when an NE finds a biggest time $T_c$ and a smallest time $T_d$, the NE may compare a first distance between the biggest time $T_c$ and the start time $T_a$ with a second distance between the start time $T_a$ and the smallest time $T_d$ to determine which time is the closest to the originally requested time interval. If the first distance is less than the second distance, then the biggest time $T_c$ is closer to the original time interval than the smallest time $T_d$ and the biggest time $T_c$ is assigned to the time T and the shift left start time $T_0$; otherwise, the smallest time $T_d$ is closer and the smallest time $T_d$ is assigned to the time T and the shift right start time $T_1$. When only a biggest time $T_c$ is found, the NE may determine that the biggest time $T_c$ is the time that is the closest to the originally requested time interval. The NE assigns the biggest time $T_c$ to the time T and the shift left start time $T_0$. When only a smallest time $T_d$ is found, the NE may determine that smallest time $T_d$ is the time that is the closest to the originally requested time interval. The NE assigns the smallest time $T_d$ to the time T and the shift right start time $T_1$.

At block 1270, a shortest path in a network, such as the network 200, from the ingress to the egress satisfying the requested constraints in the time interval from T to T+($T_b$-$T_a$) is computed, for example, by employing a CSPF algorithm. The constraint may include bandwidth, wavelengths, delays, QoS, and number of hops. For example, the NE is configured to compute paths in a single AS domain, such as the domains 240. Thus, the computed shortest path may span a segment of the LSP within the AS domain of the NE.

At decision diamond 1280, it may be determined whether a shortest path in the network that satisfies the requested constraints in the time interval from T to T+($T_b$-$T_a$) is found. At block 1290, a path may be successfully computed, and the time T and an indication of the path may be returned. For example, the NE may successfully find the shortest path in the network that satisfies the constraints in the time interval from T to T+($T_b$-$T_a$). The NE may notify the requesting entity of the computed shortest path and the time T. From the time T, the shifted time interval from T to T+($T_b$-$T_a$) is obtained. For example, the NE may send a response to the requesting entity indicating a path for the LSP satisfying the network constraint in the shifted time interval and an in-advance reservation of network resource along the path for the LSP in the shifted time interval. When it is determined that no path is found at block 1280, with the new shift left start time or the new shift right start time assigned at block 1250, the method goes to block 1210 and repeats the steps in block 1210 and the blocks below block 1210 until the method reaches block 1290 or block 1240.

Figure 10:
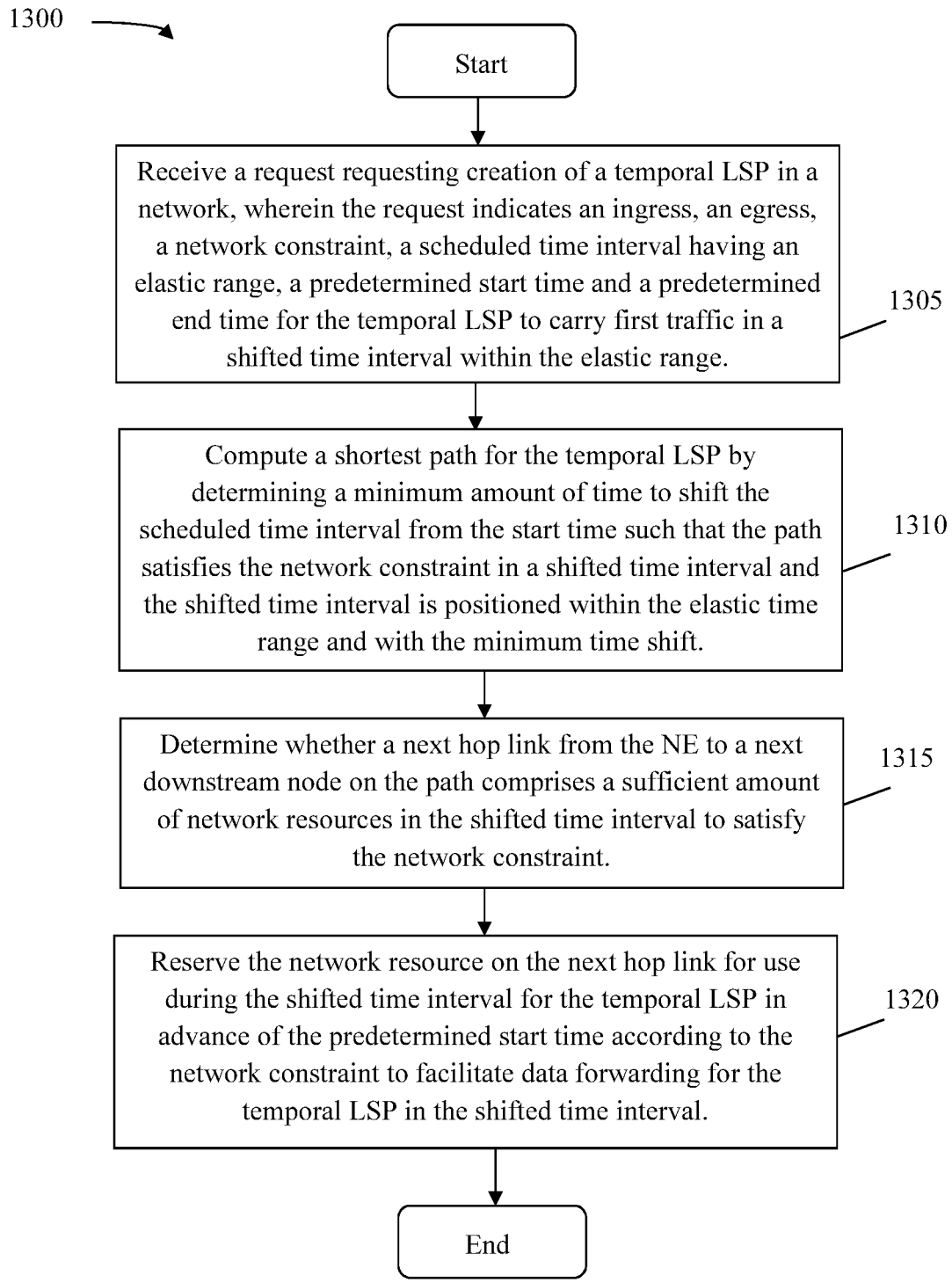
FIG. 10 is a flowchart of an embodiment of a temporal LSP creation method.

FIG. 10 is a flowchart of an embodiment of a temporal tunnel service method 1300. The method 1300 is implemented by an NE such as the edge nodes 221, the internal nodes 222, and the NE 300. The method 1300 is implemented when creating a temporal LSP, such as the LSP 150, in a network, such as the network 200, when a time interval is elastic within an elastic range lower bound, such as elastic range lower bounds 751 and 851, or an elastic range upper bound, such as elastic range upper bounds 652 and 852. At block 1305, a request requesting creation of a temporal LSP in a network is received. For example, a NE receives a request for a temporal LSP in a network. For example, the request indicates an ingress, an egress, a network constraint, a scheduled time interval having a predetermined start time and a predetermined end time for the temporal LSP to carry first traffic, and an elasticity of the scheduled time interval. At block 1310, a shortest path from the ingress to the egress for the temporal LSP is computed by determining a minimum amount of time to shift the scheduled time interval from the start time such that the path satisfies the network constraint in a shifted time interval and the shifted time interval is positioned within the elastic time range and with the minimum time shift. At block 1315, it is determined whether a next hop link from the NE to a next downstream node on the path comprises a sufficient amount of network resources in the shifted time interval to satisfy the network constraint. In one embodiment, a first Path message is created and sent to the NE when the shortest path that satisfies the constraints in the shifted time interval is computed. The first Path message comprises the ingress, the egress, the path, the constraints, and the shifted time interval. The NE determines whether a next hop link from the NE to a next downstream node on the path comprises a sufficient amount of network resources in the shifted time interval to satisfy the network constraints after receiving the first Path message. At block 320, the NE reserves the network resources such as the link bandwidth on the next hop link for use during the shifted time interval for the temporal LSP in advance of the predetermined start time according to the network constraints to facilitate data forwarding for the temporal LSP in the shifted time interval when the NE determines that the next hop link from the NE to the next downstream node on the path comprises a sufficient amount of network resources in the shifted time interval to satisfy the constraints. In one embodiment, the NE constructs a second Path message according to the first Path message and sends the second Path message to the next downstream node on the path to create the temporal LSP in the network. The second Path message comprises the ingress, the egress, the constraints and the shifted time interval.

It should be noted that after a temporal LSP is created, a requesting entity may request to increase a duration of a scheduled time interval, to decrease a duration of a scheduled time interval, to add a new time interval, or to delete a scheduled time interval. To increase a duration of a scheduled time interval, the NE may compute a path for the increased time interval satisfying a constraint of the LSP and extend the reservation of network resources on each link along the path for the LSP according to the increased time interval. In one embodiment, an NE may compute a path for the time duration that is increased from the scheduled time interval along the path computed for the LSP in the scheduled time interval and reserve network resources on each link along the path for the LSP in the duration increased. In another embodiment, an NE may compute a path for the increased time interval including the scheduled time interval and the duration increased by sharing the network resources reserved for the LSP in the scheduled time interval, release the network resources for the LSP in the scheduled time interval and reserve network resources in the increased time interval. To decrease a duration of a schedule time interval, an NE may release previously reserved network resources on each link along the LSP in the time duration that is removed. To add a new time interval, an NE may compute a path for the new time interval satisfying a constraint of the LSP and reserve network resources on each link along the path for the LSP according to the new time interval. To delete a scheduled time interval, an NE may release previously reserved network resources on each link along the path for the LSP in the deleted time interval.

As described above, once an existing MPLS TE LSP is set up, it is assumed to carry traffic forever until it is down. When an MPLS TE LSP tunnel is up, it is assumed that the LSP consumes its reserved network resources forever even though the LSP may only use network resources during some period of time. As a result, the network resources are not used efficiently. Moreover, a tunnel service may not be reserved or booked in advance for a period of time or a sequence of time periods. The disclosed embodiments describe the process for initiating an MPLS TE LSP in a period of time called a time interval or a sequence of time intervals that may be elastic. It is assumed that the LSP carries traffic during this time interval or each of these time intervals. Thus the network resources are efficiently used. More importantly, some new services may be provided. For example, a consumer may book a tunnel service in advance for a given time interval. Tunnel services may be scheduled.

A user configures a temporal LSP with a time interval or a sequence of time intervals. A simple time interval is a time period from time Ta to time Tb, which may be represented as [Ta, Tb]. When an LSP is configured with time interval [Ta, Tb], a path satisfying the constraints for the LSP in the time interval is computed and the LSP along the path is set up to carry traffic from time Ta to time Tb. In addition to simple time intervals, there are recurrent time intervals and elastic time intervals. Sometimes a simple time interval is called a time interval.

When an LSP is configured with elastic time interval "[Ta, Tb] within −P and Q", a path is computed such that the path satisfies the constraints for the LSP in the time period from (Ta+X) to (Tb+X) and |X| is the minimum value, wherein X is from −P to 0, 0, to P, or −P to Q. That is that [Ta+X, Tb+X] is the time interval closest to time interval [Ta, Tb] within the elastic range. The LSP along the path is set up to carry traffic in the time period from (Ta+X) to (Tb+X).

In one embodiment, the disclosure includes an ingress node in a network, comprising a means for receiving a request for a temporal label switched path (LSP) in the network, wherein the request indicates an ingress node, an egress node, a network constraint, and a scheduled time interval having a predetermined start time and a predetermined end time for the temporal LSP to carry traffic, a means for computing a shortest path in the network for the temporal LSP, wherein the path satisfies the network constraint in a shifted time interval when the request indicates that the time interval is elastic, and a means for reserving a network resource for use during the shifted time interval for the temporal LSP in advance of the predetermined start time, wherein the network resource is reserved on a link extending from the ingress node to a next hop node on the path, and a means for sending a path message to the next hop node to set up the temporal LSP in the network in the shifted time interval.

In another embodiment, the disclosure includes a method implemented in a NE, comprising a means for receiving, via a receiver, a request requesting creation of a temporal label switched path (LSP) in a network, wherein the request indicates an ingress, an egress, a network constraint, a scheduled time interval having an elastic range, a predetermined start time and a predetermined end time for the temporal LSP to carry first traffic in a shifted time interval within the elastic range of the scheduled time interval, a means for computing, via a processor, a shortest path for the temporal LSP by determining a minimum amount of time to shift the scheduled time interval from the start time such that the path satisfies the network constraint in a shifted time interval and the shifted time interval is positioned within the elastic time range and with the minimum time shift, a means for determining, via the processor, whether a next hop link from the NE to a next downstream node on the shortest path comprises a sufficient amount of network resources in the shifted time interval to satisfy the network constraint, and a means for reserving, via the processor, the network resource on the next hop link for use during the shifted time interval for the temporal LSP in advance of the predetermined start time according to the network constraint to facilitate data forwarding for the temporal LSP in the shifted time interval when the next hop link from the NE to the next downstream node on the shortest path comprises the sufficient amount of network resources in the shifted time interval to satisfy the network constraint.

In yet another embodiment, the disclosure includes an apparatus, comprising a means for receiving a request requesting creation of a temporal label switched path (LSP) in a network, wherein the request indicates an ingress, an egress, a network constraint and a scheduled time interval having an elastic range, a predetermined start time and a predetermined end time for the temporal LSP to carry traffic in a shifted time interval within the elastic range of the scheduled time interval, a means for computing a shortest path for the temporal LSP by determining a minimum amount of time to shift the scheduled time interval from the start time such that the path satisfies the network constraint in a shifted time interval and the shifted time interval is positioned within the elastic time range and with the minimum time shift, a means for determining whether a next hop link from the apparatus to a next downstream node on the shortest path comprises a sufficient amount of network resources in the shifted time interval to satisfy the network constraint, and a means for reserving the network resource on the next hop link for use during the shifted time interval for the temporal LSP in advance of a predetermined start time according to the network constraint to facilitate data forwarding for the temporal LSP in the shifted time interval.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed:

1. An ingress node in a network, comprising:
   a receiver configured to receive a request for a temporal label switched path (LSP) in the network, wherein the request indicates the ingress node, an egress node, a network constraint, and a scheduled time interval having a predetermined start time and a predetermined end time for the temporal LSP to carry traffic;
   a processor coupled to the receiver and configured to:
      compute a shortest path in the network for the temporal LSP, wherein the path satisfies the network constraint in a shifted time interval when the request indicates that the time interval is elastic; and
      reserve a network resource for use during the shifted time interval for the temporal LSP in advance of the predetermined start time, wherein the network resource is reserved on a link extending from the ingress node to a next hop node on the path; and
   a transmitter coupled to the processor and configured to send a path message to the next hop node to set up the temporal LSP in the network in the shifted time interval.

2. The ingress node of claim 1, wherein reserving the network resource includes a future reservation, and wherein the network resource is reserved from a time-based traffic engineering link state database (TEDB).

3. The ingress node of claim 1, wherein the request comprises a start time of the scheduled time interval, an end time of the scheduled time interval, and an elastic range upper bound, wherein the elastic range upper bound is a pre-defined amount of time by which the elastic time interval is permitted to shift positively to a later time than the start time, wherein the processor is further configured to determine a first time that is between a first shift start time and the elastic range upper bound, and wherein the first shift start time is the start time, wherein the first time is the only time between the first shift start time and the first time that has a link in a time-based traffic engineering database (TEDB) that satisfies the network constraint in a first time interval from the first time for a duration from the start time to the end time, and wherein for times between the first shift start time and the first time the link does not satisfy the network constraint from each of the times for the duration.

4. The ingress node of claim 3, wherein the processor is further configured to determine the shortest path from the ingress node to the egress node in the TEDB satisfying the network constraint in the first time interval when the first time is found.

5. The ingress node of claim 3, wherein when no path is found from the ingress node to the egress node in the TEDB satisfying the network constraint in the first time interval, the processor is further configured to:
  determine a second time that is between a second shift start time and the elastic range upper bound, and wherein the second shift start time is the first time, wherein the second time is the only time between the second shift start time and the second time that has a link in the TEDB that satisfies the network constraint in a second time interval from the second time for the duration from the start time to the end time, and wherein for times between the second shift start time and the second time the link does not satisfy the network constraint from each of the times for the duration; and
  determine the shortest path from the ingress node to the egress node in the TEDB satisfying the network constraint in the second time interval when the second time is found.

6. The ingress node of claim 1, wherein the request comprises a start time of the scheduled time interval, an end time of the scheduled time interval, and an elastic range lower bound, wherein the elastic range lower bound is a pre-defined amount of time by which the elastic time interval is permitted to shift negatively to an earlier time than the start time, wherein the processor is further configured to determine a third time that is between the start time and the elastic range lower bound, wherein the third time is the only time between the start time and the third time that has a link in a time-based traffic engineering database (TEDB) that satisfies the network constraint in a third time interval from the third time for a duration from the start time to the end time, and wherein for times between the third time and the start time the link does not satisfy the network constraint from each of the times for the duration.

7. The ingress node of claim 1, wherein the request comprises a start time of the scheduled time interval, an end time of the scheduled time interval, and an elastic range lower bound, and an elastic range upper bound, wherein the elastic range lower bound is a pre-defined amount of time by which the elastic time interval is permitted to shift negatively to an earlier time than the start time, wherein the elastic range upper bound is a pre-defined amount of time by which the elastic time interval is permitted to shift positively to a later time than the start time, wherein the processor is further configured to:
  compute a first time that is between the start time and the elastic range upper bound;
  compute a second time that is between the elastic range lower bound and the start time; and
  determine a closer time of the first time and the second time, wherein the closer time is a time that is closer to the start time and has a link in a time-based traffic engineering database (TEDB) that satisfies the network constraint in a first time interval from the closer time for a duration from the start time to the end time, and wherein for times between the start time and the closer time the link does not satisfy the network constraint from each of the times for the duration.

8. The ingress node of claim 1, wherein the request comprises a start time for the time interval and an elastic time range for the time interval, and wherein the processor is further configured to:
  compute the path for the LSP by determining a minimum amount of time to shift the time interval from the start time such that the path satisfies the network constraint in the shifted time interval and the shifted time interval is positioned within the elastic time range; and
  initiate setup of the LSP in the shifted time interval to enable the LSP to carry traffic in the shifted time interval.

9. The ingress node of claim 1, wherein the processor is further configured to initiate setup of the LSP in the elastic time interval by:
  sending, via the transmitter, a Path message to a node along the path to initiate the creation of the LSP at a beginning of the shifted time interval; and
  sending, via the transmitter, a PathTear message to a node along the path to initiate the deletion of the LSP at an end of the shifted time interval.

10. A method implemented in a network element (NE), comprising:
  receiving, via a receiver, a request requesting creation of a temporal label switched path (LSP) in a network, wherein the request indicates an ingress, an egress, a network constraint, a scheduled time interval having an elastic range, a predetermined start time and a predetermined end time for the temporal LSP to carry first traffic in a shifted time interval within the elastic range of the scheduled time interval;
  computing, via a processor, a shortest path for the temporal LSP by determining a minimum amount of time to shift the scheduled time interval from the start time such that the path satisfies the network constraint in a shifted time interval and the shifted time interval is positioned within the elastic time range and with the minimum time shift;
  determining, via the processor, whether a next hop link from the NE to a next downstream node on the shortest path comprises a sufficient amount of network resources in the shifted time interval to satisfy the network constraint; and
  reserving, via the processor, the network resource on the next hop link for use during the shifted time interval for the temporal LSP in advance of the predetermined start time according to the network constraint to facilitate data forwarding for the temporal LSP in the shifted time interval when the next hop link from the NE to the next downstream node on the shortest path comprises the sufficient amount of network resources in the shifted time interval to satisfy the network constraint.

11. The method of claim 10, further comprising:
sending, via the processor, a first Path message to itself, wherein the Path message comprises the path, the network constraint, and the shifted time interval;
receiving, via the processor, the first Path message;
generating, via the processor, a second Path message according to the first Path message to indicate the shifted time interval; and
sending, via a transmitter of the NE, the second Path message to the next downstream node to request the creation of the temporal LSP in the network in the shifted time interval.

12. The method of claim 10, wherein the request comprises a start time of the scheduled time interval, an end time of the scheduled time interval, and an elastic range upper bound, wherein the elastic range upper bound is a pre-defined amount of time by which the elastic time interval is permitted to shift positively to a later time than the start time, wherein the method further comprises determining a first time that is between a first shift start time and the elastic range upper bound, and wherein the first shift start time is the start time, wherein the first time is the only time between the first shift start time and the first time that has a link in a time-based traffic engineering database (TEDB) that satisfies the network constraint in a first time interval from the first time for a duration from the start time to the end time, and wherein for times between the first shift start time and the first time the link does not satisfy the network constraint from each of the times for the duration.

13. The method of claim 12, wherein when no path is found from the ingress to the egress in the TEDB satisfying the network constraint in the first time interval, the method further comprises:
determining a second time that is between a second shift start time and the elastic range upper bound, wherein the second shift start time is the first time, wherein the second time is the only time between the second shift start time and the second time that has a link in the TEDB that satisfies the network constraint in a second time interval from the second time for the duration from the start time to the end time, and wherein for times between the second shift start time and the second time the link does not satisfy the network constraint from each of the times for the duration; and
determining the shortest path from the ingress to the egress in the TEDB satisfying the network constraint in the second time interval when the second time is found.

14. The method of claim 10, wherein the request comprises a start time of the scheduled time interval, an end time of the scheduled time interval, and an elastic range lower bound, wherein the elastic range lower bound is a pre-defined amount of time by which the elastic time interval is permitted to shift negatively to an earlier time than the start time, wherein the method further comprises:
determining a third time that is between the elastic range lower bound and the start time, wherein the third time is the only time between the third time and the start time that has a link in a time-based traffic engineering database (TEDB) that satisfies the network constraint in a third time interval from the third time for a third duration from the start time to the end time, and wherein for times between the third time and the start time the link does not satisfy the network constraint from each of the times for the duration; and
determining the shortest path from the ingress to the egress in the TEDB satisfying the network constraint in the third time interval when the third time is found.

15. The method of claim 10, wherein the request comprises a start time of the scheduled time interval, an end time of the scheduled time interval, and an elastic range lower bound, and an elastic range upper bound, wherein the elastic range lower bound is a pre-defined amount of time by which the elastic time interval is permitted to shift negatively to an earlier time than the start time, wherein the elastic range upper bound is a pre-defined amount of time by which the elastic time interval is permitted to shift positively to a later time than the start time, wherein the method further comprises:
determining a first time that is between the start time and the elastic range upper bound;
determining a second time that is between the start time and the elastic range lower bound;
determining a closer time of the first time and the second time, wherein the closer time is a time that is closer to the start time and has a link in a time-based traffic engineering database (TEDB) that satisfies the network constraint in a first time interval from the closer time for a duration from the start time to the end time, and wherein for times between the start time and the closer time the link does not satisfy the network constraint from each of the times for the duration; and
determining the shortest path from the ingress to the egress in the TEDB satisfying the network constraint in the first time interval when the first time is found.

16. An apparatus, comprising:
a receiver configured to receive a request requesting creation of a temporal label switched path (LSP) in a network, wherein the request indicates an ingress, an egress, a network constraint and a scheduled time interval having an elastic range, a predetermined start time and a predetermined end time for the temporal LSP to carry traffic in a shifted time interval within the elastic range of the scheduled time interval;
a processor coupled to the receiver and configured to:
compute a shortest path for the temporal LSP by determining a minimum amount of time to shift the scheduled time interval from the start time such that the path satisfies the network constraint in a shifted time interval and the shifted time interval is positioned within the elastic range and with the minimum time shift;
determine whether a next hop link from the apparatus to a next downstream node on the shortest path comprises a sufficient amount of network resources in the shifted time interval to satisfy the network constraint; and
reserve the network resource on the next hop link for use during the shifted time interval for the temporal LSP in advance of a predetermined start time according to the network constraint to facilitate data forwarding for the temporal LSP in the shifted time interval.

17. The apparatus of claim 16, wherein the request further comprises a start time of the scheduled time interval, a stop time of the scheduled time interval, and an elastic upper range bound of the scheduled time interval, wherein the elastic range upper bound is a pre-defined amount of time by which the elastic time interval is permitted to shift positively to a later time than the start time, wherein the processor is further configured to determine a first time that is between a first shift start time and the elastic range upper bound, and wherein the first shift start time is the start time, wherein the first time is the only time between the first shift start time and the first time that has a link in a time-based traffic engineering database (TEDB) that satisfies the network constraint in a first time interval from the first time for a duration from the start time to the end time, and wherein for times between the first shift start time and the first time the link does not satisfy the network constraint from each of the times for the duration.

18. The apparatus of claim 17, wherein when no path is found from the ingress to the egress in the TEDB satisfying the network constraint in the first time interval, the processor is further configured to:
    determine a second time that is between a second shift start time and the elastic range upper bound, and wherein the second shift start time is the first time, wherein the second time is the only time between the second shift start time and the second time that has a link in the TEDB that satisfies the network constraint in a second time interval from the second time for the duration from the start time to the end time, and wherein for times between the second shift start time and the second time the link does not satisfy the network constraint from each of the times for the duration; and
    determine the shortest path from the ingress to the egress in the TEDB satisfying the network constraint in the second time interval when the second time is found.

19. The apparatus of claim 16, wherein the request further comprises a start time of the scheduled time interval, a stop time of the scheduled time interval, and an elastic lower range bound of the scheduled time interval, wherein the elastic range lower bound is a pre-defined amount of time by which the elastic time interval is permitted to shift negatively to an earlier time than the start time, wherein the processor is further configured to determine a third time that is between the elastic range lower bound and a third shift start time, wherein the third shift start time is the start time, wherein the third time is the only time between the third time and the start time that has a link in a time-based traffic engineering database (TEDB) that satisfies the network constraint in a third time interval from the third time for a duration from the start time to the stop time, and wherein for times between the third time and the start time the link does not satisfy the network constraint from each of the times for the duration.

20. The apparatus of claim 19, wherein when no path is found from the ingress to the egress in the TEDB satisfying the network constraint in the third time interval, the processor is further configured to:
    determine a fourth time that is between a fourth shift start time and the elastic range lower bound, wherein the fourth shift start time is the third time and the fourth time is the only time between the fourth shift start time and the fourth time that has a link in the TEDB that satisfies the network constraint in a fourth time interval from the fourth time for the duration from the start time to the stop time, wherein for times between the fourth shift start time and the fourth time the link does not satisfy the network constraint from each of the times for the duration; and
    determine the shortest path from the ingress to the egress in the TEDB satisfying the network constraint in the fourth time interval when the fourth time is found.

* * * * *